US011093203B2

(12) United States Patent
Park et al.

(10) Patent No.: US 11,093,203 B2
(45) Date of Patent: Aug. 17, 2021

(54) ELECTRONIC DEVICE HAVING TWO DISPLAY SURFACES AND METHOD FOR RUNNING DISPLAY THEREOF

(71) Applicant: Samsung Electronics Co., Ltd., Suwon-si (KR)

(72) Inventors: Doosik Park, Suwon-si (KR); Sungjun Lee, Suwon-si (KR); Hokeun Kwak, Suwon-si (KR); Chanyoung Moon, Suwon-si (KR); Woosung Chun, Suwon-si (KR); Mooyoung Kim, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/822,473

(22) Filed: Mar. 18, 2020

(65) Prior Publication Data

US 2020/0301641 A1 Sep. 24, 2020

(30) Foreign Application Priority Data

Mar. 22, 2019 (KR) .................. 10-2019-0032739

(51) Int. Cl.
*G06F 3/14* (2006.01)
*G06F 3/0484* (2013.01)
*G06F 3/041* (2006.01)

(52) U.S. Cl.
CPC .......... *G06F 3/1423* (2013.01); *G06F 3/0484* (2013.01); *G06F 3/0414* (2013.01); *G06F 2203/04102* (2013.01)

(58) Field of Classification Search
CPC .... G06F 3/1423; G06F 3/0484; G06F 3/0414; G06F 2203/4102
See application file for complete search history.

(56) References Cited

U.S. PATENT DOCUMENTS

2015/0362999 A1 12/2015 Kim et al.
2018/0011676 A1 1/2018 Han et al.
(Continued)

FOREIGN PATENT DOCUMENTS

KR 10-2010-0125934 A 12/2010
KR 10-2016-0038510 A 4/2016
(Continued)

OTHER PUBLICATIONS

International Search Report dated Jun. 24, 2020, issued in International Application No. PCT/KR2020/003685.

*Primary Examiner* — Peter D McLoone
(74) *Attorney, Agent, or Firm* — Jefferson IP Law, LLP

(57) ABSTRACT

A method and an apparatus for running and configuring a display in connection with an electronic device that can be folded and unfolded (foldable electronic device) are provided. The electronic device includes a first display surface, a second display surface, at least one sensor, at least one processor, and a memory configured to store a first application program including a first user interface and a second application program including a second user interface. The memory may store instructions that, when executed, cause the at least one processor to display the first user interface on the first display surface, display the second user interface on the second display surface, receive data from the at least one sensor, and select one of a first mode or a second mode with regard to the first display surface and select one of a third mode or a fourth mode with regard to the second display surface, at least partially based on the data.

17 Claims, 17 Drawing Sheets

(56) References Cited

U.S. PATENT DOCUMENTS

2018/0018929 A1    1/2018   Xun et al.
2019/0042066 A1    2/2019   Kim et al.

FOREIGN PATENT DOCUMENTS

| KR | 10-2017-0047057 A | 5/2017 |
| KR | 10-2017-0074726 A | 6/2017 |

ELECTRONIC DEVICE HAVING TWO DISPLAY SURFACES AND METHOD FOR RUNNING DISPLAY THEREOF

CROSS-REFERENCE TO RELATED APPLICATION(S)

This application is based on and claims priority under 35 U.S.C. § 119 of a Korean patent application number 10-2019-0032739, filed on Mar. 22, 2019, in the Korean Intellectual Property Office, the disclosure of which is incorporated by reference herein in its entirety.

BACKGROUND

1. Field

The disclosure relates to a method and an apparatus for running a display in connection with an electronic device having two display surfaces.

2. Description of Related Art

Recent development of digital technology has been followed by widespread use of various types of electronic devices, such as mobile communication terminals, smartphones, tablet personal computers (PCs), laptop computers, or wearable devices.

Recent electronic devices have gradually increasing screen sizes, and are designed to provide various services to users through large screens. Electronic devices may have new form factors such as dual display devices (for example, foldable devices). Foldable devices may be equipped with displays that can fold (or bend), such as flexible displays, and can be used in folded or unfolded conditions.

When a foldable device is used in a folded state, power may be consumed unnecessarily if the display surface currently not used by the user (or rear surface, which the user does not view) keeps displaying a screen. In addition, an erroneous operation may occur if the user makes an unintended touch while gripping the same.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for running a display (for example, first display surface and second display surface) in connection with an electronic device (for example, foldable device) having at least two display surfaces.

Another aspect of the disclosure is to provide a method and an apparatus for adaptively running a display so as to correspond to a folding state or an unfolding state in connection with an electronic device including a first display surface and a second display surface.

Another aspect of the disclosure is to provide a method and an apparatus for distinguishing operations of the front and rear surfaces of a display in connection with an electronic device including a first display surface and a second display surface, and executing an application program based on a power saving mode with regard to the rear surface.

Another aspect of the disclosure is to provide a method and an apparatus for supporting continuous use of an application program operating on the rear surface in connection with electronic device including a first display surface and a second display surface, and preventing electricity consumption and erroneous operations regarding inputs (for example, touches).

Additional aspects will be set forth in part in the description which follows and, in part, will be apparent from the description, or may be learned by practice of the presented embodiments.

In accordance with an aspect of the disclosure, an electronic device is provided. The electronic device includes a housing having a first part and a second part, a first display surface positioned on the first part and operable in a first mode in which first power is used and in a second mode in which second power is used, the second power being lower than the first power, a second display surface positioned on the second part and operable in a third mode in which third power is used and in a fourth mode in which fourth power is used, the fourth power being lower than the third power, at least one sensor positioned inside the housing and configured to sense a state in which a user moves or grips the electronic device, at least one processor positioned inside the housing and operably connected to the at least one sensor, and a memory positioned in the housing, operably connected to the at least one processor, and configured to store a first application program including a first user interface and a second application program including a second user interface. The memory may be configured to store instructions that, when executed, cause the at least one processor to display the first user interface on the first display surface, display the second user interface on the second display surface, receive data from the at least one sensor, and select one of the first mode or the second mode with regard to the first display surface and select one of the third mode or the fourth mode with regard to the second display surface, at least partially based on the data.

In accordance with another aspect of the disclosure, a method for operating an electronic device is provided. The method includes displaying a first user interface on a first display surface, displaying a second user interface on a second display surface, receiving data from at least one sensor, and selecting one of a first mode or a second mode with regard to the first display surface and one of a third mode or a fourth mode with regard to the second display surface, at least partially based on the data. The first display surface may be operable in the first mode in which first power is used, and in the second mode in which second power is used, the second power being lower than the first power. The second display surface is operable in the third mode in which third power is used and in the fourth mode in which fourth power is used, the fourth power being lower than the third power.

In order to solve the above-mentioned problems, various embodiments may include a computer-readable recording medium in which a program for executing the above method by a processor is recorded.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
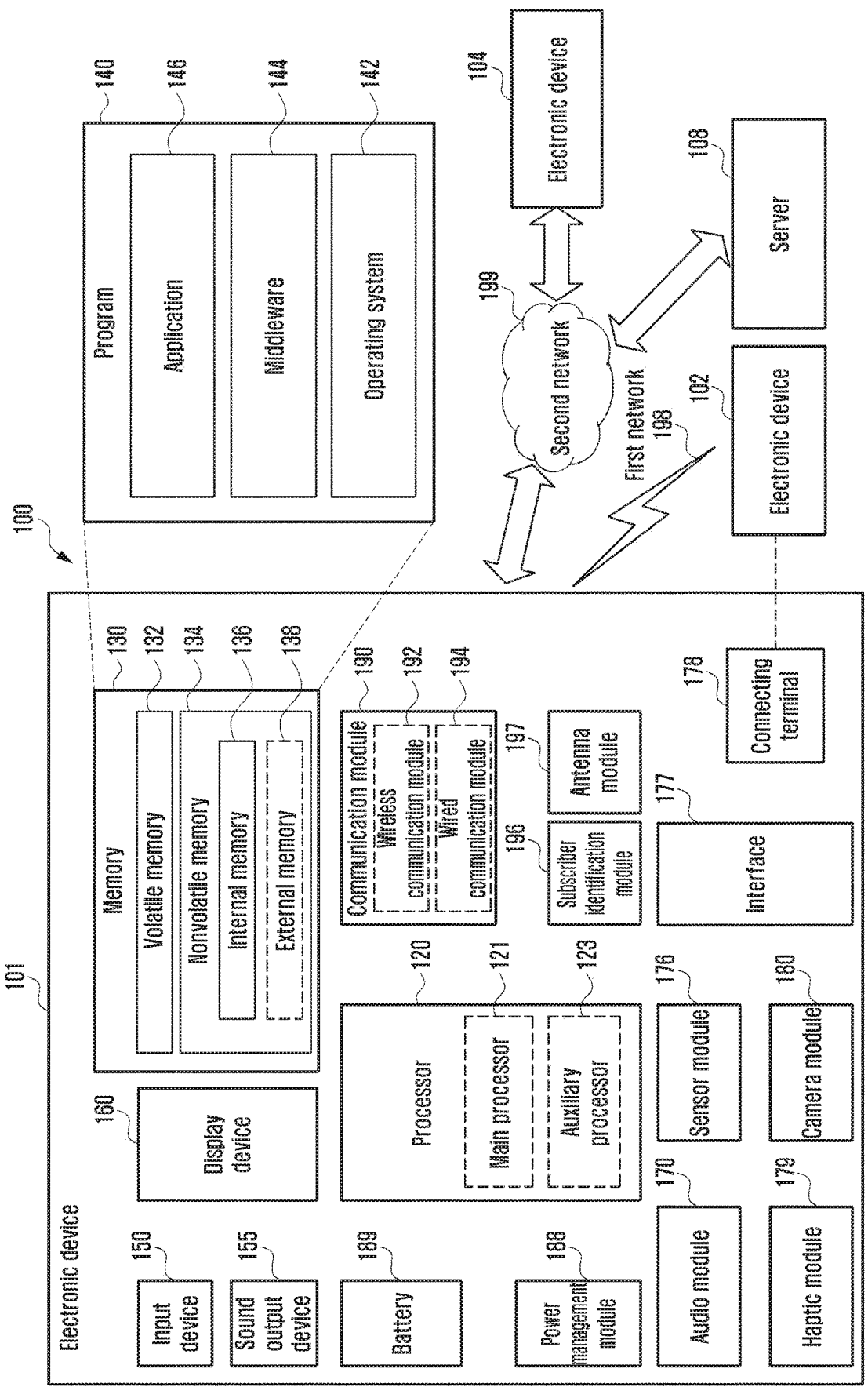
FIG. 1 illustrates an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an electronic device and a method for operating the same, according to various embodiments, in connection with an electronic device (for example, foldable device) including a first display surface and a second display surface (hereinafter, referred to as "dual display surface device"), the display (for example, first display surface and second display surface) may be run adaptively based on the state of the display (for example, folding state or unfolding state). According to various embodiments, in connection with the dual display surface device, operations of the front and rear surfaces of the display may be distinguished, and an application program may be run, based on a power saving mode, with regard to the rear surface. According to various embodiments, in connection with the dual display surface device, continuous use of an application program operating on the rear surface may be supported, and electricity consumption and erroneous operations regarding inputs (for example, touches) may be prevented.

According to an embodiment, if a multi-window is used through multi-tasking based on one screen in connection with the dual display surface device (for example, in the unfolding state of the electronic device), and if the user changes the same to a folding state, the opposite area (for example, rear surface) to the user's field of view may be deactivated (for example, switching to a touchscreen power-saving mode and/or a display power-saving mode), in order to prevent electricity consumption or erroneous operations (for example, touches) during use. According to various embodiments, even if the rear surface is deactivated, the application program operating on the rear surface may continue to be executed. According to various embodiments, the operation of the application program operating on the rear surface may be continuously maintained such that, if the user changes the dual display surface device back to the unfolding state, or if the user overturns the dual display surface device (for example, if the user rotates the device such that the rear surface becomes the front surface viewed by the user), continuous operation of the application program is guaranteed. According to various embodiments, the execution state of the application program operating on the rear surface based on the user's field of view may be maintained based on a power-saving mode such that, while preventing electricity consumption and erroneous operations, the user is enabled to use the application program continuously and more quickly when switching to the unfolding state, or if the rear and front surfaces are switched.

FIG. 1 illustrates an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

Figure 2:
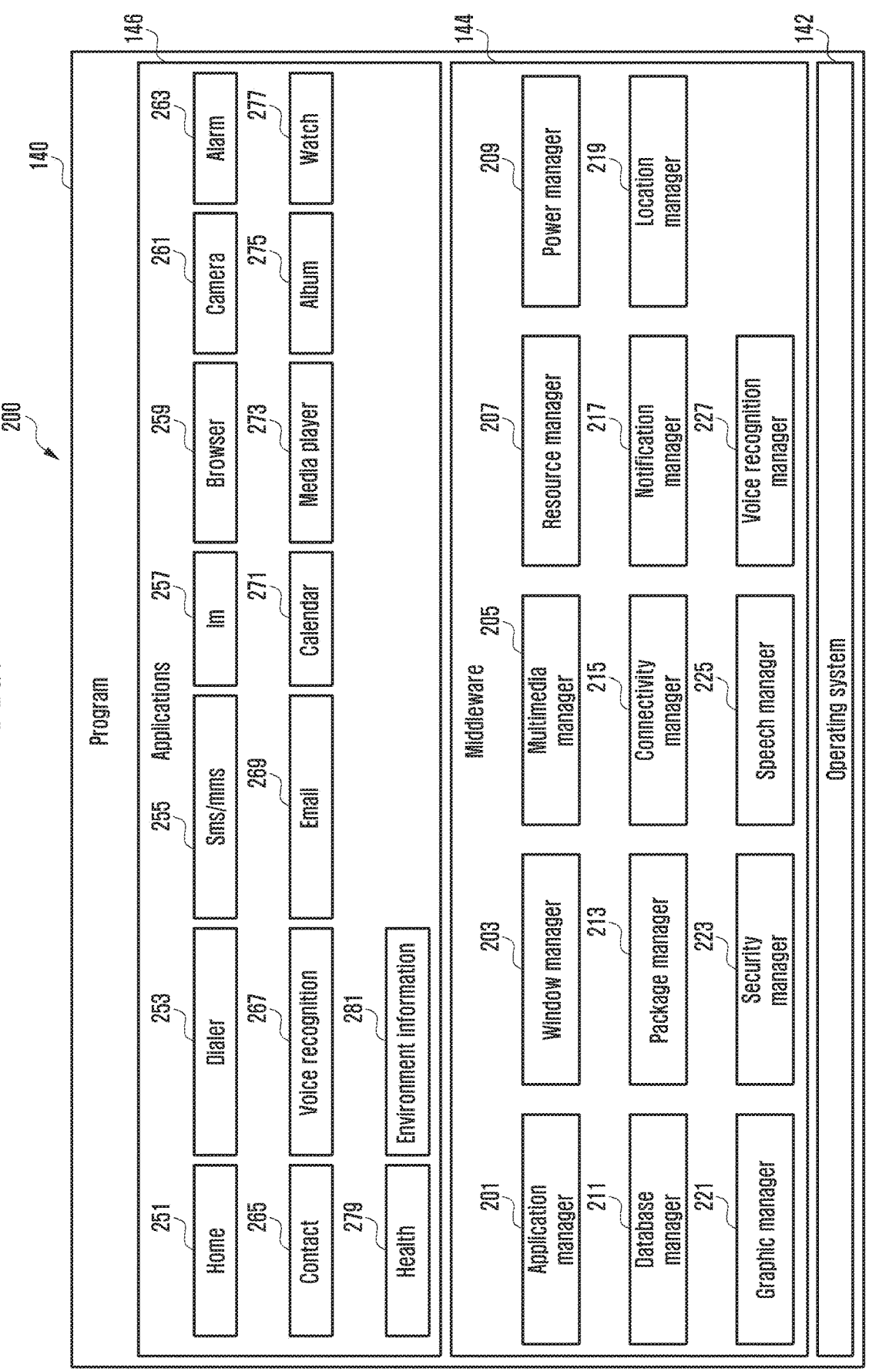
FIG. 2 is a block diagram illustrating the program according to an embodiment of the disclosure.

FIG. 2 is a block diagram 200 illustrating the program 140 according to an embodiment of the disclosure.

Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225 (e.g., a speech manager), or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device.

The information exchange application, for example, may include a notification relay application adapted to transfer designated information (e.g., a call, message, or alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
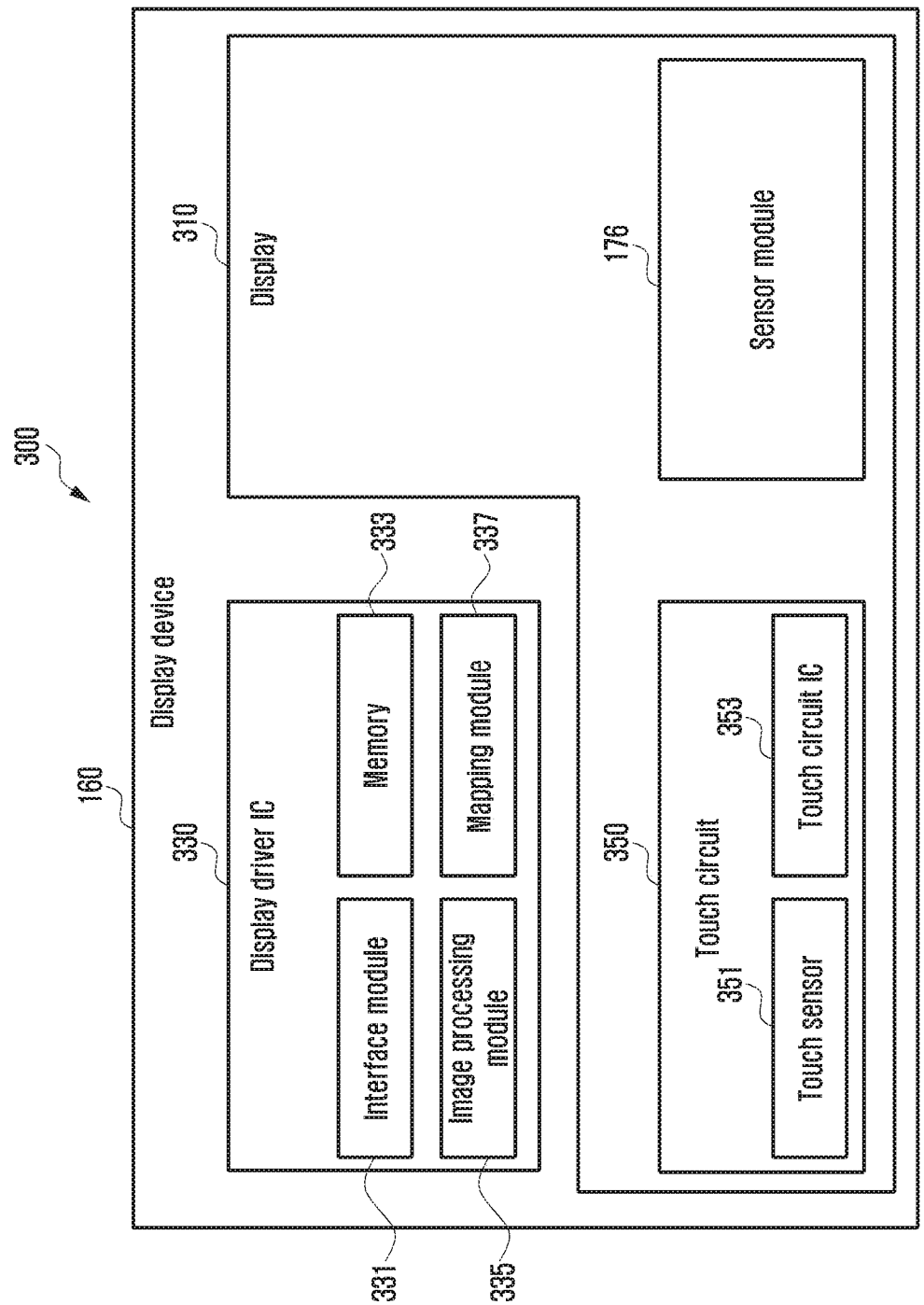
FIG. 3 is a block diagram illustrating the display device according to an embodiment of the disclosure.

FIG. 3 is a block diagram 300 illustrating the display device 160 according to an embodiment of the disclosure.

Referring to FIG. 3, the display device 160 may include a display 310 and a display driver integrated circuit (DDI) 330 to control the display 310. The DDI 330 may include an interface module 331, memory 333 (e.g., buffer memory), an image processing module 335, or a mapping module 337. The DDI 330 may receive image information that contains image data or an image control signal corresponding to a command to control the image data from another component of the electronic device 101 via the interface module 331. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 330 may communicate, for example, with touch circuitry 350 or the sensor module 176 via the interface module 331. The DDI 330 may also store at least part of the received image information in the memory 333, for example, on a frame by frame basis.

The image processing module 335 may perform preprocessing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 310.

The mapping module 337 may generate a voltage value or a current value corresponding to the image data pre-processed or post-processed by the image processing module 335. According to an embodiment, the generating of the voltage value or current value may be performed, for example, based at least in part on one or more attributes of the pixels (e.g., an array, such as a red, green, and blue (RGB) stripe or a pentile structure, of the pixels, or the size of each subpixel). At least some pixels of the display 310 may be driven, for example, based at least in part on the voltage value or the current value such that visual information (e.g., a text, an image, or an icon) corresponding to the image data may be displayed via the display 310.

According to an embodiment, the display device 160 may further include the touch circuitry 350. The touch circuitry 350 may include a touch sensor 351 and a touch sensor IC 353 to control the touch sensor 351. The touch sensor integrated circuit (IC) 353 may control the touch sensor 351 to sense a touch input or a hovering input with respect to a certain position on the display 310. To achieve this, for example, the touch sensor 351 may detect (e.g., measure) a change in a signal (e.g., a voltage, a quantity of light, a resistance, or a quantity of one or more electric charges) corresponding to the certain position on the display 310. The touch circuitry 350 may provide input information (e.g., a position, an area, a pressure, or a time) indicative of the touch input or the hovering input detected via the touch sensor 351 to the processor 120. According to an embodiment, at least part (e.g., the touch sensor IC 353) of the touch circuitry 350 may be formed as part of the display 310 or the DDI 330, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 310, the DDI 330, or the touch circuitry 350)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 310. As another example, when the sensor module 176 embedded in the display device 160 includes a pressure sensor, the pressure sensor may obtain pressure information corresponding to a touch input received via a partial or whole area of the display 310. According to an embodiment, the touch sensor 351 or the sensor module 176 may be disposed between pixels in a pixel layer of the display 310, or over or under the pixel layer.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
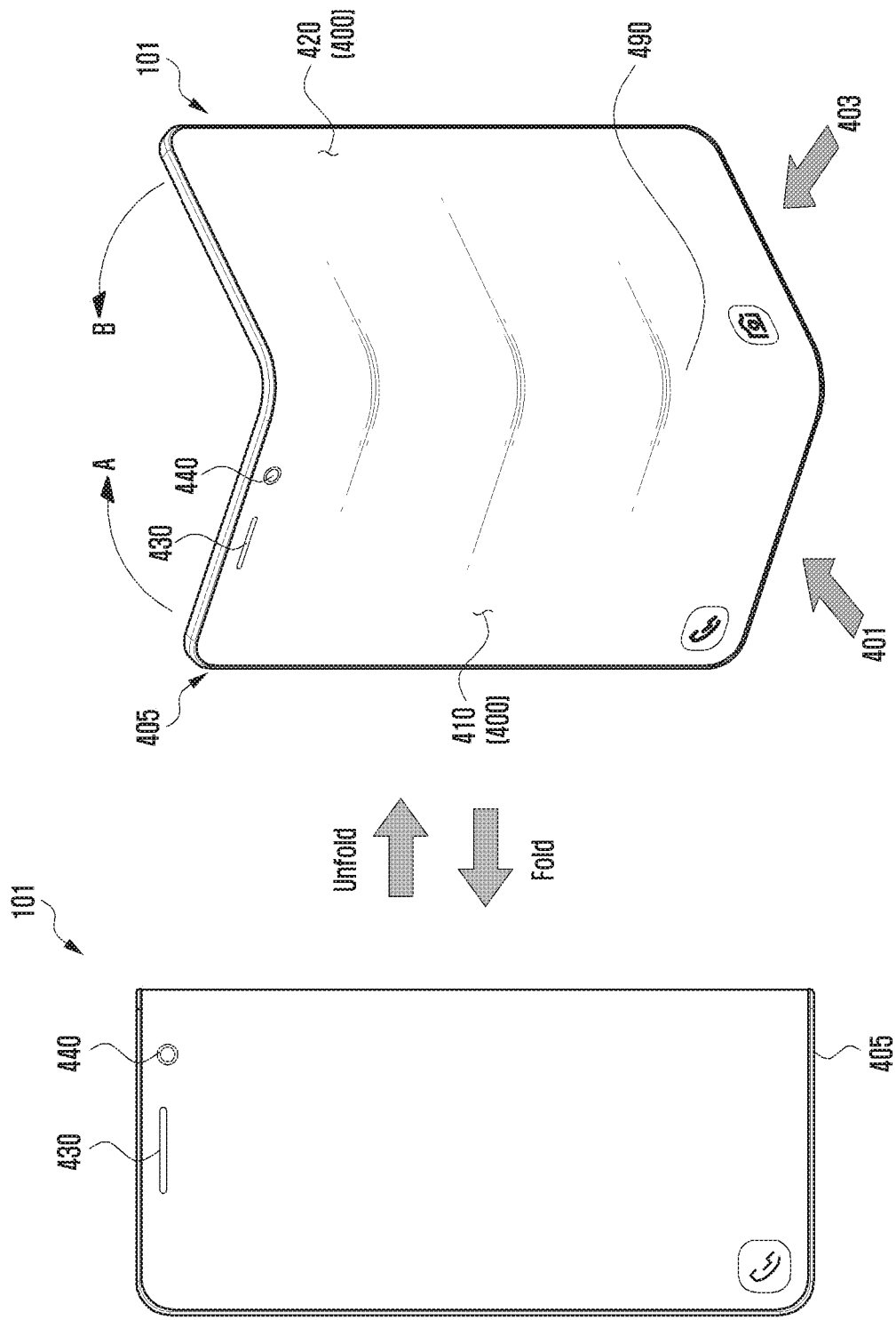
FIG. 4 is a diagram illustrating an electronic device having two display surfaces according to an embodiment of the disclosure.
Figure 5:
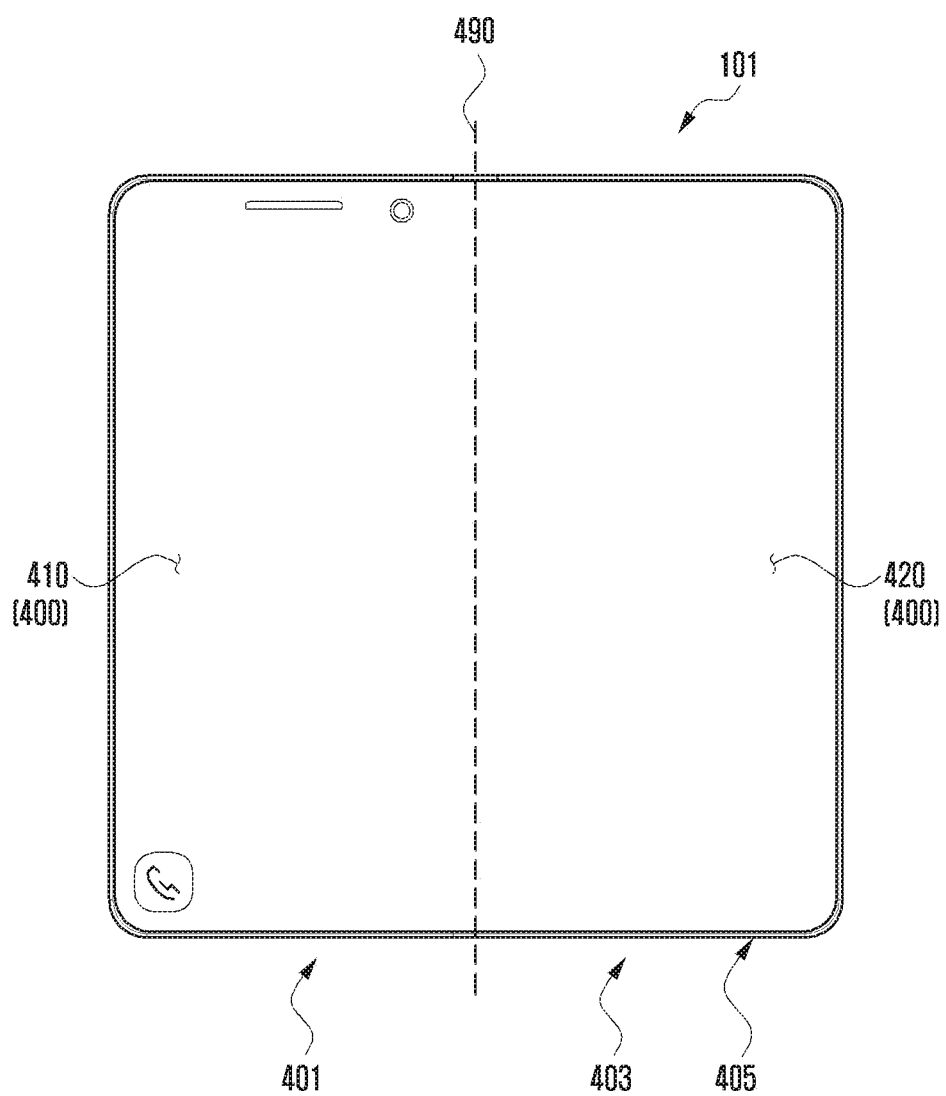
FIG. 5 is a diagram illustrating an electronic device having two display surfaces according to an embodiment of the disclosure.
Figure 6:
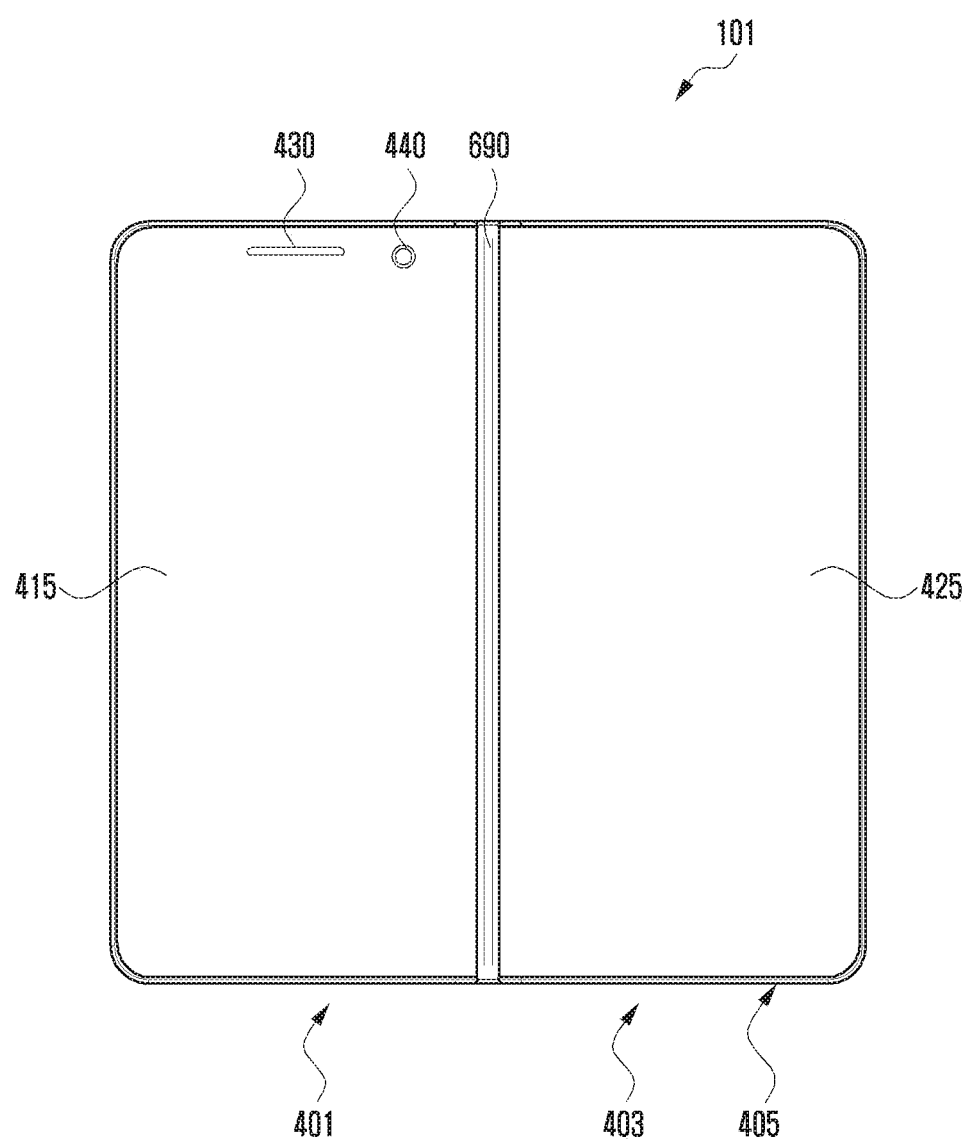
FIG. 6 is a diagram illustrating an electronic device having two display surfaces according to an embodiment of the disclosure.

FIG. 4 is a diagram illustrating electronic devices 101 having two display surfaces according to an embodiment of the disclosure, FIG. 5 is a diagram illustrating electronic devices 101 having two display surfaces according to an embodiment of the disclosure, and FIG. 6 is a diagram illustrating electronic devices 101 having two display surfaces according to an embodiment of the disclosure.

According to an embodiment, FIG. 4, FIG. 5, and FIG. 6 may illustrate examples of changing the form of the display (for example, display 310 in FIG. 3) in connection with an electronic device 101 including at least two display surfaces (for example, first display surface and second display surface) (hereinafter, simply referred to as electronic device 101).

According to various embodiments, the electronic device 101 may include a foldable device that can be folded and unfolded. For example, the electronic device 101 may be configured such that, when folded (for example, in the folding state), the first and second display surfaces are distinguished as front and rear surfaces, thereby making it possible to use a display having a relatively small size, and when unfolded (for example, in the unfolding state), all of the first and second display surfaces are provided as a single surface (for example, front surface), thereby making it possible to use a display having a relatively large size. According to various embodiments, the electronic device 101 may be equipped with a foldable (or bendable) display (for example, flexible display) such that the same can be folded or unfolded and then used.

According to an embodiment, FIG. 4 may illustrate an example of a change the electronic device 101 undergoes from a folding (for example, out folding) state to an unfolding state. According to an embodiment, FIG. 5 and FIG. 6 may illustrate examples of changes the electronic device 101 undergoes to the unfolding state.

According to an embodiment, FIG. 5 may illustrate an example of distinguishing a display 400 (for example, display 310 in FIG. 3) into a first display surface 410 (or first area) (for example, front or rear area during folding) and a second display surface 420 (or second area) (for example, rear or front area during folding).

According to various embodiments, FIG. 6 may illustrate an example of separating the display 400 into a first display surface 415, which corresponds to the first display surface 410 in FIG. 5, and a second display surface 425, which corresponds to the second display surface 420 in FIG. 5, in hardware terms (or the first and second display surfaces are independent of each other).

According to various embodiments, the electronic device 101 as illustrated in FIG. 4 and FIG. 5 may include a display driver IC (DDI) (for example, DDI 330 in FIG. 3) operably or electrically connected to the processor (for example, processor 120 in FIG. 1) and the display 400 (for example, first display surface 410 and second display surface 420). For example, the first display surface 410 and the second display surface 420 may be connected to one DDI. Various embodiments are not limited thereto, and the electronic device 101 may include a first DDI operably or electrically connected to the first display surface 410, and a second DDI operably or electrically connected to the second display surface 420.

According to various embodiments, the electronic device 101 as illustrated in FIG. 6 may include two DDIs operably or electrically connected to the processor 120 and the display 400. For example, the electronic device 101 as illustrated in FIG. 6 may include a first DDI for the first display surface 415 and a second DDI for the second display surface 425. According to various embodiments, the first display surface 410 or 415 and the second display surface 420 or 425 may be operably or electrically connected to each other, and may be formed by a single flexible display.

According to various embodiments, as illustrated in FIG. 5 and FIG. 6, according to the manner of implementation of the electronic device 101, the display 400 may be folded (for example, out-folded) or unfolded in various types.

Referring to FIG. 4 to FIG. 6, the electronic device 101 may include a housing 405 including a first part 401 and a second part 403, a first display surface 410 or 415, and a second display surface 420 or 425.

According to an embodiment, the first display surface 410 or 415 may be positioned on the first part 401 of the housing 405, and may operate in a first mode in which the same uses first power and in a second mode in which the same uses second power that is lower than the first power.

According to an embodiment, the second display surface 420 or 425 may be positioned on the second part 403 of the housing 405, and may operate in a third mode in which the same uses third power and in a fourth mode in which the same uses fourth power that is lower than the third power.

According to various embodiments, the housing 405 may including a foldable structure (for example, hinge structure), and the first part 401 and the second part 403 may be formed to face away from each other in a folding state and to face in the same direction in an unfolding state.

According to an embodiment, the electronic device 101 may include, on the first part 401 of the housing 405, a speaker (or receiver) 430 (for example, sound output device 155 in FIG. 1) and/or a camera 440 (for example, camera module 180 in FIG. 1). According to an embodiment, at least a part of the first part 403 and/or the second part 403 may further include another constituent element (for example, physical home button, function button (for example, volume adjustment button), at least one sensor (for example, luminance sensor)), according to the manner of implementation of the electronic device 101.

According to an embodiment, the electronic device 101 may include, inside the housing 405, at least one sensor (for example, sensor module 176 in FIG. 1) configured to sense a state in which the electronic device 101 is moved or gripped, at least one processor (for example, processor 120 in FIG. 1) (for example, an AP, a CP, and/or a GPU for controlling the electronic device 101) operably connected to the at least one sensor, and a memory (for example, memory 130 in FIG. 1) operably connected to the processor 120 and configured to store a first application program including a first user interface and a second application program including a second user interface.

According to an embodiment, the at least one sensor (for example, sensor module 176 in FIG. 1) may include a sensor configured to determine the operating state (for example, folding state or unfolding state) of the electronic device 101 (or the display 400 of electronic device 101) and/or a sensor (for example, acceleration sensor or gyro sensor) configured to determine the rotation and direction of the electronic device 101.

According to another embodiment, the at least one sensor may further include at least one of a touch sensor (for example, touch sensor 351 in FIG. 3) or a pressure sensor (not illustrated). For example, the electronic device 101 may use at least one of the touch sensor or the pressure sensor so as to determine the state in which the electronic device 101 is gripped by the user. According to an embodiment, the touch sensor 351 and/or the pressure sensor may be included in and integrated with the display 310. In this case, at least one of the touch sensor or the pressure sensor included in the display 310 may be considered as being positioned inside the housing 405 of the electronic device 101.

According to an embodiment, the electronic device 101 may determine the state in which the same is gripped by the user based on at least one of the touch sensor or the pressure sensor, may determine the folding or unfolding state of the electronic device 101 at least partially based on the gripped state, and may determine the front and rear surfaces in the folding state. For example, the electronic device 101 may determine the gripping mode (for example, left-hand mode, right-hand mode, or both-hand mode) based on at least one of the point of touch of the user's finger (and/or palm) on at least one display surface, the area of touch, and/or the number of points of touch, and may determine the front and rear surfaces according to the gripping mode.

Referring to FIG. 4 to FIG. 6, the electronic device 101 may switch from the folding state (for example, out folding state of the display 400) to the unfolding state (for example, unfolding state of the display 400), or vice versa.

According to an embodiment, the electronic device 101 may store one or more application programs (for example, first application program and second application program) in the memory 130 inside the electronic device 101, and may display user interfaces related to the application programs (for example, a first user interface related to the first application program and a second user interface related to the second application program) on the first display surface 410 or 415 and on the second display surface 420 or 425, respectively (or independently). According to an embodiment, the electronic device 101 may display the first user interface of the first application program based on the first display surface 410 or 415, and may display the second user interface of the second application program based on the second display surface 420 or 425.

According to various embodiments, the electronic device 101 may cause the display 400 to display the first user interface and/or the second user interface according to the changing state of the display (for example, folding state or unfolding state). According to an embodiment, the operating state may include a first state in which the folding state switches to the unfolding state, a second state in which the unfolding state switches to the folding state, and a third state in which the front/rear surface of the electronic device 101 is rotated in the folding state (for example, operation of rotating the electronic device 101 while the user views one display surface such that the user then can view the other display surface).

According to various embodiments, according to a change in the form (or state) of the display 400, such as folding or unfolding of the display 400, the electronic device 101 may provide the first or second user interface based on one display surface, or may provide the first and second user interfaces based on the first display surface 410 or 415 and the second display surface 420 or 425. According to an embodiment, based on the first operating state (for example, folding state→unfolding state), the electronic device 101 may display the first user interface and the second user interface on both surfaces of the display 400 (for example, the first display surface 410 or 415 and the second display surface 420 or 425), respectively.

According to an embodiment, based on the second operating state (for example, unfolding state→folding state), the electronic device 101 may display the first or second user interface on one display surface (for example, the first display surface 410 or 415 or the second display surface 420 or 425) identified as the front surface (for example, the display surface viewed by the user or the display surface currently used or activated).

According to various embodiments, the electronic device 101 may include one folding shaft (for example, folding shaft 490 in FIG. 5 or hinge shaft 690 in FIG. 6). Various embodiments are not limited to this example, and the electronic device 101 may include multiple folding shafts. For example, the electronic device 101 may include two folding shafts implemented to equally divide the display 400 of the electronic device 101 into three parts, respectively.

Referring to FIG. 4 to FIG. 6, the electronic device 101 may include a vertical folding shaft 490 extending through the center of the electronic device 101 (for example, extending through the center of the display 400, or between the first display surface 410 and the second display surface 420) (or the hinge shaft 690 in FIG. 6) (hereinafter, simply referred to as folding shaft 490). According to an embodiment, the electronic device 101 may be folded (or bent) or unfolded with reference to the folding shaft 490. According to various embodiments, the electronic device 101 may exhibit a form in which the display 400 (for example, first display surface 410 or 415 or second display surface 420 or 425) is folded outward such that the same is exposed to the outside of the electronic device 101 (for example, out-folding form). For example, in FIG. 4 to FIG. 6, a display 400 (for example, first display surface 410 or 415 and second display surface 420 or 425) may be implemented on each of the front surface (or first surface) and the rear surface (or second surface) of the electronic device 101, and each display 400 may be folded outward to be exposed.

According to various embodiments, referring to FIG. 4, the statement that the electronic device 101 is fully folded (for example, folding state) may mean that two parts A and B (for example, back surface parts of housing 405) included on the other surface (for example, back surface) of the electronic device 101, on which no display 400 of the electronic device 101 is implemented, face each other such that the two parts A and B are completely or almost parallel with each other. For example, the statement that the electronic device 101 is fully folded may mean that the two parts A and B included on the other surface of the electronic device 101 are disposed almost closely, not necessarily contacting each other.

According to various embodiments, the statement that the electronic device 101 is fully unfolded (for example, unfolding state) as illustrated in FIG. 5 or 6 may mean that the first display surface 410 or 415 of the first part 401 of the electronic device 101 and the second display surface 420 or 425 of the second part 403 thereof are exposed to the outside and thus constitute a plane, like a single display 400, such that the area of the display 400 exposed to the outside is the largest, or close to the largest value.

According to various embodiments, the folding shaft 490, although illustrated as extending through the center of the electronic device 101, may exist in any position in connection with the electronic device 101. For example, the electronic device 101 may be folded or bent asymmetrically with reference to the folding shaft 490 such that, when the electronic device 101 is folded, the two display surfaces divided by the folding shaft 490 may overlap each other to a different extent (or the first display surface 410 or 415 and the second display surface 420 or 425, which are distinguished after folding, have different sizes). According to an embodiment, according to the degree of folding of the electronic device 101, the electronic device 101 may have a form between a fully folded state and a fully unfolded state.

According to various embodiments, the electronic device 101 may identify the folding state of the display 400 (for example, fully folded state) or the degree of folding thereof (for example, the degree of bending). According to various embodiments, the electronic device 101 may identify the folding state or the degree of folding and may accordingly activate or deactivate a partial area of the display 400 included in the electronic device 101 (for example, the first display surface 410 or 415 or the second display surface 420 or 425). According to an embodiment, upon identifying the folding state of the display 400, the electronic device 101 may determine the display surface currently in use (or front surface) or the display surface currently not in use (or deactivated display surface) (or rear surface), may activate the display surface in use based on the result of determination, and may deactivate the display surface not in use.

According to various embodiments, the electronic device 101 may sense a change in the form (for example, folding and unfolding) of the display 400 based on various types.

According to an embodiment, the electronic device 101 may include at least one sensor (for example, sensor module 176 in FIG. 1). According to various embodiments, the at least one sensor may include, for example, at least one or a combination of a proximity sensor, a luminance sensor, a magnetic sensor, a Hall sensor, a gesture sensor, a bending sensor, an infrared sensor, a touch sensor, a pressure sensor, and an infrared camera.

According to an embodiment, the at least one sensor may be positioned on one side of the electronic device 101 (for example, on the folding shaft 490, on an end of the housing 405, on the lower end of the display 400 (for example, under the panel), or on the bezel of the display 400) so as to measure the unfolding angle of the electronic device 101. According to an embodiment, the unfolding angle may refer to the angle between two display surfaces of the electronic device 101, divided by the folding shaft 490, and the folding shaft 490.

According to an embodiment, the electronic device 101 may measure the folding angle so as to determine whether the electronic device 101 is fully folded or fully unfolded. For example, if the folding angle measured by the electronic device 101 is about 180° or an angle close thereto, the electronic device 101 may determine that the display 400 of the electronic device 101 is fully unfolded (for example, unfolding state). As another example, if the unfolding angle measured by the electronic device 101 is about 0° or an angle close thereto, the electronic device 101 may determine that the display 400 of the electronic device 101 is fully folded (for example, folding state).

According to various embodiments, if the measured unfolding angle is within a predetermined angle range, based on data acquired from at least one sensor, the electronic device 101 may determine that the display 400 of the electronic device 101 is folded or unfolded to a predetermined extent.

According to an embodiment, the at least one sensor may be positioned on the lower end of the display 400 so as to identify the state in which the electronic device 101 is gripped by the user, or the shape in which the same is gripped. For example, if the electronic device 101 is in a folding state, the touch sensor (for example, touch sensor 351 in FIG. 3) may be used to identify the gripped shape, and the display surface in use (or front surface) or the display surface not in use (or deactivated display surface) (or rear surface) may be determined based on the same.

As described with reference to FIG. 4 to FIG. 6, the electronic device 101 according to various embodiments may include a display 400 configured as a flexible display that can be folded or unfolded (for example, first display surface 410 or 415 and second display surface 420 or 425), or may be implemented in various forms such that two separate displays 400 (for example, first display surface 415 and second display surface 425) can be folded or unfolded by a hinge structure or hinge shaft 690 (for example, a hinge structure based on two independent displays (for example, first display surface 415 and second display surface 425). According to various embodiments, the electronic device 101 may be folded or unfolded based on one or more folding shafts. According to various embodiments, the electronic device 101 may have a display 400 in various forms.

An electronic device 101 according to various embodiments may include: a housing (for example, housing 405 in FIG. 4) including a first part (for example, first part 401 in FIG. 4) and a second part (for example, second part 403 in FIG. 4); a first display surface (for example, first display surface 410 or 415 in FIG. 4 or FIG. 6) positioned on the first part 401 and capable of operating in a first mode in which first power is used and in a second mode in which second power is used, the second power being lower than the first power; a second display surface (for example, second display surface 420 or 425 in FIG. 4 or FIG. 6) positioned on the second part 403 and capable of operating in a third mode in which third power is used and in a fourth mode in which fourth power is used, the fourth power being lower than the third power; at least one sensor (for example, sensor module 176 in FIG. 1) positioned inside the housing 405 and configured to sense a state in which a user moves or grips the electronic device 101; at least one processor (for example, processor 120 in FIG. 1) positioned inside the housing 405 and operably connected to the at least one sensor module 176; and a memory (for example, memory 130 in FIG. 1) positioned in the housing 405, operably connected to the processor 120, and configured to store a first application program including a first user interface and a second application program including a second user interface. The memory 130 may be configured to store instructions that, when executed, cause the processor 120 to: display the first user interface on the first display surface 410 or 415; display the second user interface on the second display surface 420 or 425; receive data from the at least one sensor module 176; and select one of the first mode or the second mode with regard to the first display surface 410 or 415 and select one of the third mode or the fourth mode with regard to the second display surface 420 or 425, at least partially based on the data.

According to various embodiments, the instructions may be configured to cause the processor 120 to simultaneously select the first mode and the fourth mode or simultaneously select the second mode and the third mode, at least partially based on the data.

According to various embodiments, the electronic device 101 may include at least one display driver IC (DDI) (for example, DDI 330 in FIG. 3) operably or electrically connected to the processor 120, the first display surface 410 or 415, and the second display surface 420 or 425. For example, the electronic device 101 may include one DDI (for example, DDI 330 in FIG. 3) operably or electrically connected to the processor 120, the first display surface 410, and the second display surface 420. As another example, the electronic device 101 may include a first DDI operably or electrically connected to the processor 120 and the first display surface 410 or 415, and a second DDI operably or electrically connected to the processor 120 and the second display surface 420 or 425.

According to various embodiments, the instructions may be configured to cause the processor 120 to: simultaneously select the first mode and the third mode and then change the third mode to the fourth mode while maintaining the first mode, or change the first mode to the second mode while maintaining the third mode, at least partially based on the data.

According to various embodiments, the housing 405 may include a foldable structure, and the first part 401 and the second part 403 may be configured to face away from each other in a folding state and to face in an identical direction in an unfolding state.

According to various embodiments, the first display surface 410 and the second display surface 420 may be connected to each other and formed by a flexible display. According to an embodiment, the first display surface 415 and the second display surface 425 may be formed by displays, respectively, which are operably or electrically connected to each other, and which are distinguished in hardware terms.

According to various embodiments, the instructions may be configured to cause the processor 120 to select the first mode and the third mode in the unfolding state and simultaneously select the first mode and the fourth mode or simultaneously select the second mode and the third mode, at least partially based on the data, in the folding state.

According to various embodiments, the first mode and the third mode may include a mode in which the first application program and the second application program operate based on a first performance, the second mode and the fourth mode may include a mode in which the first application program and the second application program operate based on a second performance, and the second performance may be inferior to the first performance. In an embodiment, the first mode and the third mode may include a power normal mode in which power higher than that in a power saving mode is used. The second mode and the fourth mode may include a power saving mode.

According to an embodiment, the electronic device 101 may differently run the display surface based on a performance mode (for example, first performance (or power normal mode) or second performance (or power saving mode). For example, the electronic device 101 may differently adjust and provide screen quality factors, based on the performance mode, such as the brightness of the screen on the display surface (for example, luminance adjustment), the degree of color expression (for example, color reproduction range adjustment), the degree of expressing a dark/bright screen (for example, contrast ratio adjustment), the response time for image display, the viewing angle for displaying the same color at multiple angles, the resolution for detailed screen expression, or the number of frames displayed on the display surface per second (for example, screen refresh rate (or scanning rate)). According to an embodiment, the electronic device 101 may vary the sampling rate of the touch sensor, based on the performance mode, or may differently adjust the sensitivity. According to an embodiment, the electronic device 101 may control turning on/off (for example, activation/deactivation) of the display surface and/or the touch sensor associated with the display surface based on the performance mode. For example, with regard to the display surface running with a second performance (or power saving mode), the electronic device 101 may maintain a screen quality lower than that in the case of the first performance (or power normal mode), may maintain a low sampling rate of the touch sensor associated with the corresponding display surface, or may turn off (or deactivate) the corresponding display surface and the touch sensor associated therewith.

According to various embodiments, the instructions may be configured to cause the processor 120 to: sense an operating state changing from an unfolding state to a folding state, based on at least one piece of data; distinguish a front surface and a rear surface with regard to the first display surface 410 or 415 and the second display surface 420 or 425; execute an application program based on the first performance with regard to a display surface operating as the front surface; and execute an application program based on the second performance with regard to a display surface operating as the rear surface.

According to various embodiments, the instructions may be configured to cause the processor 120 to: deactivate the display surface operating as the rear surface; and execute, based on the second performance, the application program operating on the display surface, or execute the application in the background so as to maintain the execution state of the application program. According to an embodiment, the electronic device 101 may differently run, according to the state of the display surface, an application program according to the performance mode (for example, first performance (power normal mode) or second performance (or power saving mode). According to an embodiment, the electronic device 101 may run, based on the first performance, the application program operating (or being executed) on the display surface operating as the front surface. According to an embodiment, the electronic device 101 may run, based on the second performance, the application program operating (or being executed) on the display surface operating as the rear surface and may maintain the execution state. Alternatively, the electronic device 101 may run the application program that is operating (or being executed) so as to operate in the background, and may maintain the execution state.

According to various embodiments, the instructions may be configured to cause the processor 120 to: sense an operating state in which the front surface and the rear surface switch, in the folding state, based on the at least one piece of data; distinguish the front surface and the rear surface with regard to the first display surface 410 or 415 and the second display surface 420 or 425; run, based on the first performance, the application program operating based on the second performance, on the display surface switching to the front surface; and run, based on the second performance, the application program operating based on the first performance, on the display surface switching to the rear surface. According to an embodiment, when a display surface switches to the front or rear surface, the electronic device 101 may maintain the operating (or execution) state of the application program and may simultaneously vary the performance mode for running the application on the corresponding display surface, according to the switching state of the display surface.

According to various embodiments, the instructions may be configured to cause the processor 120 to: display a switching object (for example, switching object 1250 in FIG. 12) in at least a partial area of the front surface in the folding state; acquire a user input based on the switching object 1250; and display information regarding the application program on the rear surface, based on the user input, through the at least partial area of the front surface.

According to various embodiments, operations performed by the electronic device 101 described below may be executed by at least one processor of the electronic device 101 (for example, at least one processor including a processing circuit, such as the processor 120 in FIG. 1). According to an embodiment, operations performed by the electronic device 101 may be executed by instructions which are stored in the memory (for example memory 130 in FIG. 1), and which, when executed, cause the processor 120 to operate.

According to various embodiments, the electronic device 101 may include a display 400 (for example, display 310 in FIG. 3), at least one processor 120 operably connected to the display 400, and a memory 130 operably connected to the processor 120. According to an embodiment, the memory 130 may be configured to store a first application program including a first user interface and a second application program including a second user interface.

According to various embodiments, the processor 120 may perform an operation related to selecting a mode related to the display 400 by using a learning model learnt by using an AI algorithm. For example, the processor 120 may perform operations related to predicting the folding state (or start of folding) of the display 400 or the unfolding state (or start of unfolding) thereof by using the learning model learnt by using the AI algorithm, and predicting a mode related to the display 400 at least partially based on the folding or unfolding state. According to an embodiment, the processor 120 may perform an operation related to selecting a mode related to the display 400 by using at least one AI algorithm selected from, for example, machine learning, a neural network, genetic, deep leaning, or a classification algorithm.

Figure 7:
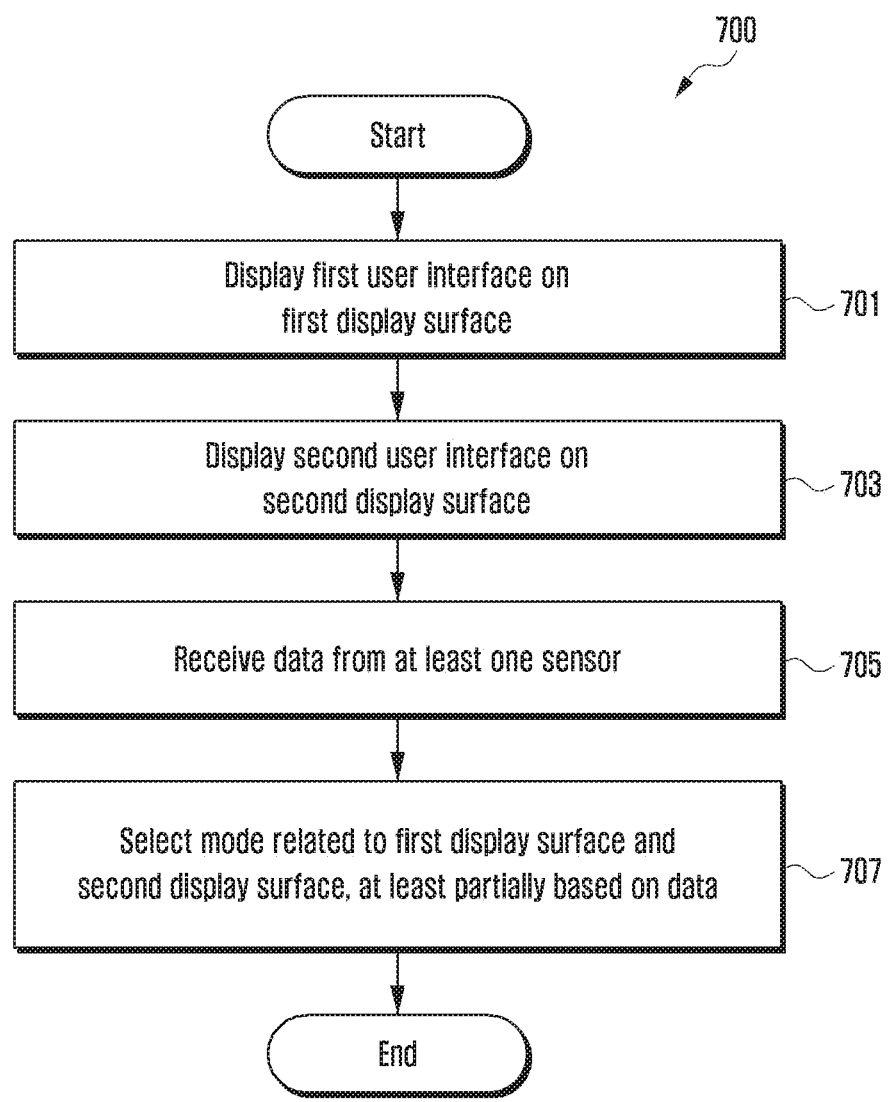
FIG. 7 is a flowchart illustrating a method for operating an electronic device according to an embodiment of the disclosure.

FIG. 7 is a flowchart 700 illustrating a method for operating an electronic device 101 according to an embodiment of the disclosure.

According to an embodiment, FIG. 7 may illustrate an example of determining (or selecting) a mode related to the first display surface 410 or 415 of the first part 401 (hereinafter, simply referred to as first display surface 410) and the second display surface 420 or 425 of the second part 403 (hereinafter, simply referred to as second display surface 420) in the unfolding state of the electronic device 101 (for example, electronic device 101 in FIG. 1) (for example, in the unfolding state of the display 400 in FIG. 5 or FIG. 6).

Referring to FIG. 7, according to an embodiment, in operation 701, the processor 120 of the electronic device 101 may display a first user interface on the first display surface 410. According to an embodiment, the electronic device 101 may include a housing 405 including a first part 401 and a second part 403, and the first display surface 410 may be positioned on the first part 401 of the housing 405.

According to an embodiment, the first display surface 410 may operate in a first mode in which the same uses first power and in a second mode in which the same uses second power that is lower than the first power. According to an embodiment, the second power may have a magnitude (or value) different from that of the first power (for example, power related to a power saving mode, which is lower than the first power). According to an embodiment, the first power and the second power may have different power magnitudes related to a computing resource (or capability) for running an application program on the front and rear surfaces of the display 400.

According to an embodiment, the computing resource may include a hardware resource of the electronic device 101, which is used when the electronic device 101 executes an application program. For example, the hardware resource may include at least one processor 120 (for example processor 120 in FIG. 1), a display device (for example, display device 160 in FIG. 1), or a memory 130 (for example, memory 130 in FIG. 1).

According to an embodiment, in operation 703, the processor 120 may display a second user interface on the second display surface 420. According to an embodiment, the electronic device 101 may include a housing 405 including a first part 401 and a second part 403, and the second display surface 420 may be positioned on the second part 403 of the housing 405.

According to an embodiment, the second display surface 420 may operate in a third mode in which the same uses third power and in a fourth mode in which the same uses fourth power that is lower than the third power. According to an embodiment, the fourth power may have a magnitude (or value) different from that of the third power (for example, power related to a power saving mode, which is lower than the fourth power). According to an embodiment, the third power and the fourth power may have different power magnitudes related to a computing resource (or capability) for running an application program on the front and rear surfaces of the display 400. According to an embodiment, the first power and the third power may have identical or different power magnitudes. According to an embodiment, the second power and the fourth power may have identical or different power magnitudes.

According to an embodiment, the first mode and the third mode may be used to operate an application program in a normal mode, and may be run based on identical or different power magnitudes. According to an embodiment, the second and fourth modes may be used to operate an application program in a power saving mode, and may be run based on identical or different power magnitudes. According to various embodiments, operation 701 and operation 703 are not limited to the illustration in FIG. 7, and may proceed in a continuous or parallel manner (or approximately simultaneously).

According to an embodiment, in operation 705, the processor 120 may receive (or acquire) data from at least one sensor (for example, sensor module 176 in FIG. 1). According to an embodiment, the at least one sensor may be positioned inside the housing 405 and may be operably connected to the processor 120. According to an embodiment, the at least one sensor may sense a state in which the user moves or grips the electronic device 101, and may provide the processor 120 with data regarding the sensed state.

According to an embodiment, in operation 707, the processor 120 may select a mode related to the first display surface 410 and the second display surface 420, at least partially based on the data. According to an embodiment, the processor 120 may select one of the first mode or the second mode with regard to the first display surface 410, at least partially based on the data, and may select one of the third mode or the fourth mode with regard to the second display surfaced 420. According to an embodiment, the processor 120 may simultaneously select the first mode and the fourth mode or simultaneously select the second mode and the third mode, at least partially based on the data. According to an embodiment, the processor 120 may simultaneously select the first mode and the third mode and then change the third mode to the fourth mode while maintaining the first mode, or change the first mode to the second mode while maintaining the third mode, at least partially based on the data.

According to an embodiment, the processor 120 may select the first mode and the third mode in the unfolding state of the electronic device 101, and may simultaneously select the first mode and the fourth mode or simultaneously select the second mode and the third mode, at least partially based on the data, in the folding state. Operations for determining (or selecting) a mode related to running an application program on the first display surface 410 and the second display surface 420 according to various embodiments will be described later with reference to the drawings.

Figure 8:
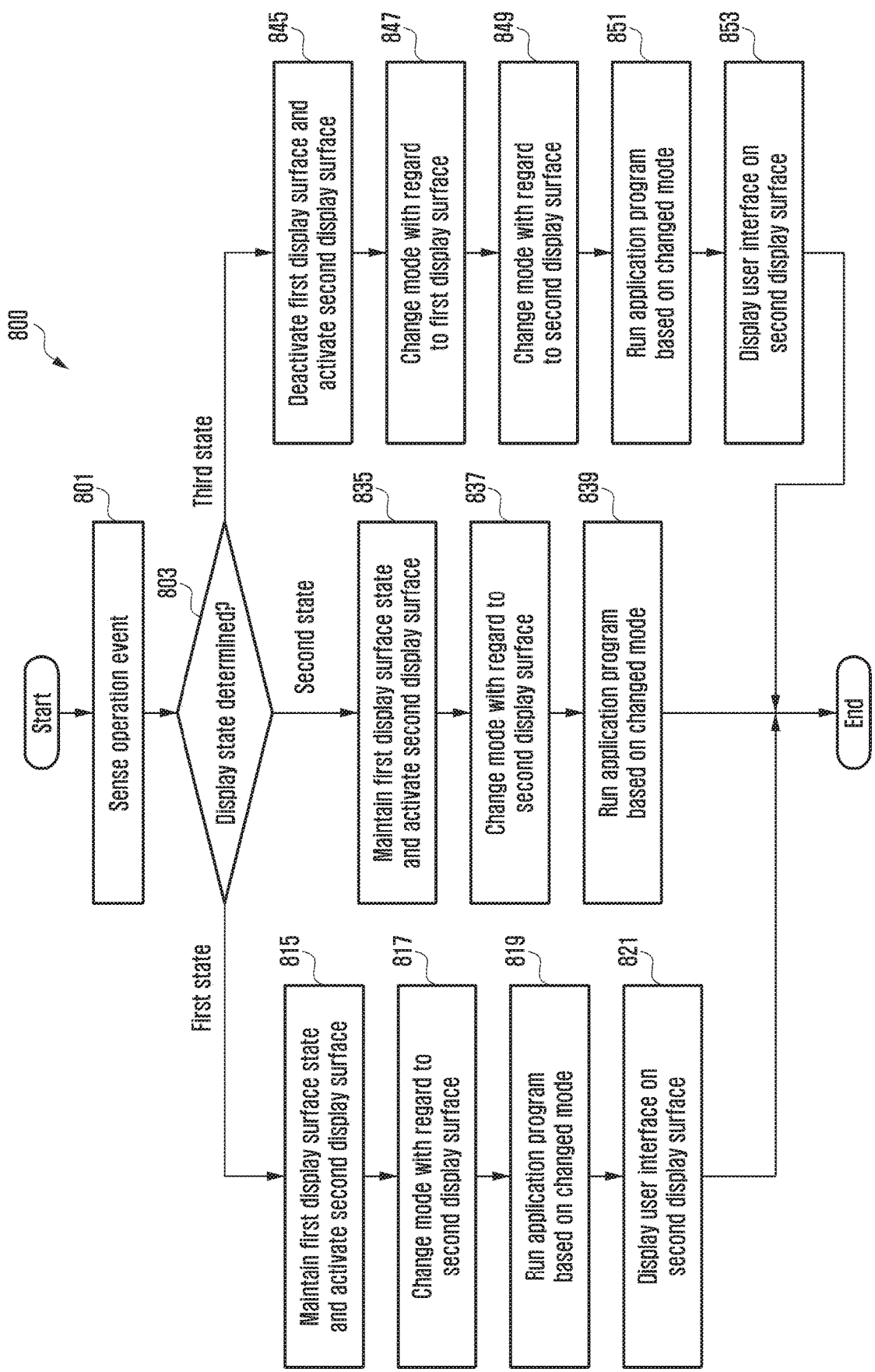
FIG. 8 is a flowchart illustrating a method for operating an electronic device according to an embodiment of the disclosure.

FIG. 8 is a flowchart 800 illustrating a method for operating an electronic device 101 according to an embodiment of the disclosure.

According to an embodiment, FIG. 8 may illustrate an example wherein, in a specific state (for example, folding or unfolding state) of the electronic device 101, and based on an operation event that changes the state of the display 400, the corresponding state of the display 400 (for example, first operating state (for example, unfolding state), second operating state (for example, folding state), or third operating state (for example, state in which the front/rear surface rotates in the folding state) is identified, and the display 400 and/or an application program are differently run based on the identified state of the display 400.

Referring to FIG. 8, according to an embodiment, in operation 801, the processor 120 of the electronic device 101 may sense an operation event. According to an embodiment, the processor 120 may sense an operation event that changes the state of the display 400 based on at least one sensor (for example, sensor module 176 in FIG. 1). According to an embodiment, the state of the display 400 may include a first state (for example, change from folding state to unfolding state), a second state (for example, change from unfolding state to folding state), or a third state (for example, change that rotates the front/rear surface of the electronic device 101 in the folding state).

According to an embodiment, in operation 803, the processor 120 may determine the state of the display 400. For example, upon sensing an operation event that changes the state of the display 400, the processor 120 may determine whether the state of the display 400 corresponds to the first state, the second state, or the third state. According to an embodiment, the processor 120 may acquire data (for example, sensor data) related to the change in the state of the display 400 from at least one sensor, and may identify the state of the display 400 based on the acquired data.

According to an embodiment, the at least one sensor may include a sensor (for example, smart Hall sensor) configured to determine the state (for example, folding or unfolding state) of the electronic device 101 (or display 400 of the electronic device 101) and/or a sensor (for example, acceleration sensor or gyro sensor) configured to determine the rotation and direction of the electronic device 101. According to another embodiment, the at least one sensor may further include at least one of a touch sensor (for example, touch sensor 351 in FIG. 3) or a pressure sensor (not illustrated). For example, the processor 120 may use at least one of the touch sensor or the pressure sensor so as to determine the state in which the electronic device 101 is gripped by the user. According to an embodiment, the touch sensor 351 and/or the pressure sensor may be included and integrated with the display 310. In this case, the touch sensor or the pressure sensor, included in the display 310, may be regarded as being positioned inside the housing 405 of the electronic device 101.

According to an embodiment, the processor 120 may determine the user-gripped state at least partially based on one of the touch sensor or the pressure sensor, may determine the folding or unfolding state of the electronic device 101 based on the gripped state, and may determine the front and rear surfaces in the folding state. For example, the processor 120 may determine the gripping mode (for example, lefthanded mode, righthanded mode, or bothhanded mode) based on at least one of the point of touch of the user's finger (and/or palm) on at least one display surface, the area of touch, and/or the number of touch points and may determine the front and rear surfaces according to the gripping mode.

According to an embodiment, the processor 120 may activate the second display surface while maintaining the state of the first display surface in operation 815, based on the first state determined in operation 803. According to an embodiment, the first display surface in FIG. 8 may correspond to the first display surface 410 (for example, display surface viewed by the user) of the first part 401 of the display 400 illustrated in FIG. 4, for example, which is currently used by the user. According to an embodiment, the second display surface in FIG. 8 may correspond to the second display surface 420 (for example, display surface not viewed by the user) of the second part 403 of the display 400 illustrated in FIG. 4, for example, which is not used by the user.

For example, the first display surface may correspond to the display surface viewed by the user, and the second display surface may correspond to the display surface (for example, rear surface) facing away from the display surface (for example, front surface) viewed by the user. According to an embodiment, the operation of the processor 120 activating the second display surface based on the first state may include the an operation of activation in terms of power associated with the second display surface and/or an operation of activation in terms of the performance, which changes the performance mode of the second display surface (for example, second performance→first performance) while maintaining the activation state in terms of the power.

According to various embodiments, the operation of the processor 120 activating the second display surface may include an operation of supplying power to the deactivated second display surface (for example, turning on the power) so as to activate the same (for example, in FIG. 3, activate the touch circuit 350 and the display 310 area corresponding to the second display surface). According to various embodiments, the operation of the processor 120 deactivating the second display surface may include an operation of blocking power supplied to the activated second display surface (for example, turning off the power) so as to deactivate the same (for example, in FIG. 3, deactivate the touch circuit 350 and the display 310 area corresponding to the second display surface).

According to various embodiments, the operation of the processor 120 activating/deactivating the second display surface may include an operation of activating/deactivating the same according to the performance mode. For example, the processor 120 may differently run the display surface based on the performance mode (for example, first performance (or power normal mode) or second performance (or power saving mode). For example, the processor 120 may differently adjust and provide screen quality factors, based on the performance mode, such as the luminance of the display surface, the color reproduction range, the contrast ratio, the response time, the viewing angle, the resolution, or the screen refresh rate (or scanning rate).

According to an embodiment, the processor 120 may vary the sampling rate of the touch sensor, based on the performance mode, or may differently adjust the sensitivity. According to an embodiment, the electronic device 101 may control turning on/off (for example, activation/deactivation) of the display surface and/or the touch sensor associated with the display surface, based on the performance mode. For example, with regard to the display surface running with a second performance (or power saving mode), the processor 120 may maintain a screen quality lower than that in the case of the first performance (or power normal mode), may maintain a low sampling rate of the touch sensor associated with the corresponding display surface, or may turn on/off (or activate/deactivate) the corresponding display surface and the touch sensor associated therewith.

According to various embodiments, in connection with performing operation 815, the processor 120 may perform an operation of identifying the unfolding target display surface (for example, second display surface that changes from the rear surface to the front surface as a result of unfolding), for example, and an operation of identifying the operating timepoint associated with unfolding of the target display surface (for example, display surface). According to an embodiment, the operating timepoint associated with unfolding may be identified based on the unfolding angle of the display 400.

According to an embodiment, the processor 120 may acquire data (for example, sensing data) regarding the angle between the first display surface 410 of the first part 401 of the housing 405 and the second display surface 420 of the second part 403 thereof, based on at least one sensor, during an operation of the electronic device 100 switching from the fully folded state (for example, folding state) to the fully unfolded state (for example, unfolding state). According to an embodiment, the processor 120 may compare the acquired data with preconfigured first reference data (for example, reference data for identifying the first operating timepoint at which the second state changes to the first state) such that, if the acquired data corresponds to the first reference data, the timepoint at which the display 400 switches from the folding state to the unfolding state is confirmed.

According to an embodiment, the first reference data may be about 180°, or may include an angle close thereto. In some embodiments, the first reference data may include a designated angle (for example, about 45°, about 90°, or about 135°) between the fully unfolded angle (about 180°) and the fully folded angle (about 0°).

According to various embodiments, based on the state of the display 400 (for example, display surface operating as the rear surface or switching from the rear surface to the front surface), the processor 120 may control activation or deactivation of the corresponding display surface. According to various embodiments, in connection with the application program operating on the display surface controlled to be activated or deactivated, the processor 120 may vary the performance mode for running the same according to the state of the display 400.

According to an embodiment, in operation 817, the processor 120 may change the mode related to running the application program with regard to the second display surface. According to an embodiment, the processor 120 may maintain the mode (for example, first or second mode) selected with regard to the first display surface and may change the mode (for example, fourth mode) selected with regard to the second display surface to a different mode (for example, fourth or third mode). According to an embodiment, a mode selected with regard to a display mode may include, for example, a mode related to running an application program (for example, first or second application program) on the corresponding display surface (first or second display surface).

According to an embodiment, the first and third modes may include a mode in which the first and second application programs operate based on the first performance, and the second and fourth modes may include a mode in which the first and second application programs operate based on the second performance. According to an embodiment, the second performance may be configured to be inferior to the first performance. According to an embodiment, the first and third modes may include a power normal mode using a larger amount of power than a power saving mode, and the second and fourth modes may include the power saving mode.

According to an embodiment, maintaining the mode selected with regard to the first display surface may include a state in which the application program (for example, first application program) executed on the first display surface, for example, is executed with a low or high performance based on a designated computing resource (or capability). For example, the processor 120 may operate in the first or second mode selected with regard to the first application program operating on the first display surface.

According to an embodiment, changing the mode related to the second display surface may include an operation of changing the application program (for example, second application program) that is being executed (or operating) based on a first designated computing resource (for example, low-performance execution) on the second display surface, for example, such that the same is executed based on a second designated computing resource (for example, high-performance execution). For example, the processor 120 may include an operation of changing the fourth mode selected with regard to the second application program operating on the second display surface to the third mode.

According to an embodiment, the computing resource may include a hardware resource of the electronic device 101, which is used when the electronic device 101 runs (or executes) an application program. For example, the hardware resource may include at least one processor 120 (for example, application processor (AP), central processing unit (CPU), or graphics processing unit (GPU)), a display device (for example, display device 160 in FIG. 1), or a memory 130 (for example, storage device (for example, volatile memory in which commands and/or data are loaded, or a nonvolatile memory for storing results of processing and acquiring by the electronic device 101)).

According to an embodiment, in operation 819, the processor 120 may run the application program (for example, second application program) based on the mode changed with regard to the second display surface. According to an embodiment, the processor 120 may run the application program by using a computing resource corresponding to the mode (for example, third mode) changed with regard to the second display surface.

According to an embodiment, in operation 821, the processor 120 may display a user interface (for example, second user interface) on the second display surface. According to an embodiment, while displaying the first user interface related to the first application program on the first display surface, the processor 120 may display the second user interface related to the second application program on the second display surface.

According to an embodiment, based on the second state determined in operation 803, the processor 120 may deactivate the second display surface while maintaining the state of the first display surface in operation 835. According to an embodiment, the first display surface and the second display surface in FIG. 8 may correspond to the first display surface 410 of the first part 401 of the display 400 illustrated in FIG. 5, for example, which is currently used by the user (for example, viewed by the user), and the second display surface 420 of the second part 403, respectively. According to an embodiment, the operation of the processor 120 deactivating the second display surface based on the second state may include, as described above, an operation of maintaining the deactivation state in terms of power associated with the second display surface and/or the activation state in terms of power, and an operation of deactivation in terms of performance, which changes the performance mode of the second display surface (for example, first performance→second performance).

According to various embodiments, in connection with performing operation 835, the processor 120 may perform an operation of identifying the folding target display surface (for example, second display surface that changes from the front surface to the rear surface as a result of folding), for example, and an operation of identifying the operating timepoint associated with folding of the target display surface (for example, second display surface). According to an embodiment, the operating timepoint associated with folding may be identified based on the folding angle of the display 400.

According to an embodiment, the processor 120 may acquire data (for example, sensing data) regarding the angle between the first display surface 410 of the first part 401 of the housing 405 and the second display surface 420 of the second part 403 thereof, based on at least one sensor, during an operation of the electronic device 100 switching from the fully unfolded state (for example, unfolding state) to the fully folded state (for example, folding state). According to an embodiment, the processor 120 may compare the acquired data with preconfigured second reference data (for example, reference data for identifying the second operating timepoint at which the first state changes to the second state) such that, if the acquired data corresponds to the second reference data, the timepoint at which the display 400 switches from the unfolding state to the folding state is confirmed.

According to an embodiment, the second reference data may be about 0°, or may include an angle close thereto. In some embodiments, the second reference data may include a designated angle (for example, about 45°, about 90°, or about 135°) between the fully folded angle (about 0°) and the fully unfolded angle (about 180°).

According to an embodiment, the first reference data for identifying the first operating timepoint in the first state and the second reference data for identifying the second operating timepoint in the second state may have the same value (for example, the same reference angle) or different values (for example, different reference angles). For example, the first reference data and the second reference data are for the purpose of determining the operating timepoint based on unfolding or folding of the display 400, and may be configured as the same angle (for example, about 90°) designated between the fully unfolded angle (about 180°) and the fully folded angle (about 0°), or as different angles (for example, the first reference data corresponds to a first angle (for example, about 45° (or about 135°) with reference to the angle of unfolding from about 0° (for example, folding state)), and the second reference data corresponds to a second angle (for example, about 135° (or about 30°) with reference to the angle of folding from about 180° (for example, unfolding state))).

According to various embodiments, based on the state of the display 400 (for example, display surface which operates as the front surface, or which switches from the front surface to the rear surface), the processor 120 may control activation or deactivation of the corresponding display surface. According to various embodiments, in connection with the application program operating on the display surface controlled to be activated or deactivated, the processor 120 may vary the performance mode for running the same according to the state of the display 400.

According to an embodiment, in operation 837, the processor 120 may change the mode related to running the application program with regard to the second display surface. According to an embodiment, while maintaining the mode (for example, first or second mode) selected with regard to the first display surface, the processor 120 may change the mode (for example, third or fourth mode) selected with regard to the second display surface to a different designated mode (for example, fourth mode).

According to an embodiment, a mode selected with regard to a display surface may include, for example, a mode related to running an application program (for example, first or second application program) on the corresponding display surface (first or second display surface). According to an embodiment, the first and third modes may include a mode in which the first and second application programs operate based on the first performance, and the second and fourth modes may include a mode in which the first and second application programs operate based on the second performance. According to an embodiment, the second performance may be configured to be inferior to the first performance. According to an embodiment, the first and third modes may include a power normal mode using a larger amount of power than a power saving mode, and the second and fourth modes may include the power saving mode.

According to an embodiment, maintaining the mode selected with regard to the first display surface may include a state in which the application program (for example, first application program) that is being executed on the first display surface is executed with a low or high performance based on a designated computing resource (or capability). For example, the processor 120 may operate in a first or second mode selected with regard to the first application program operating on the first display surface.

According to an embodiment, changing the mode related to the second display surface may include an operation of changing the application program (for example, second application program) that is being executed (or operating) based on a first or second designated computing resource (for example, low-performance or high-performance execution) on the second display surface, for example, to a state in which the same is executed based on a first designated computing resource (for example, low-performance execution). For example, the processor 120 may include an operation of changing the third mode selected with regard to the second application program operating on the second display surface to the fourth mode.

According to an embodiment, in operation 839, the processor 120 may run an application program (for example, second application program) based on the mode changed with regard to the second display surface. According to an embodiment, the processor 120 may run the application program by using a computing resource corresponding to the mode (for example, fourth mode) changed with regard to the second display surface. According to an embodiment, the processor 120 may maintain the state in which the application program (for example, first application program) is run with regard to the first display surface.

According to an embodiment, based on the third state determined in operation 803, the processor 120 may deactivate the first display surface and activate the second display surface in operation 845. According to an embodiment, the operation of activating or deactivating the first display surface and the second display surface in FIG. 8 may include, as described above, an operation of maintaining the activation/deactivation state in terms of power associated with the first display surface and the second display surface and/or the activation state in terms of power, and an operation of activation/deactivation in terms of performance, which changes the performance mode of the first display surface and the second display surface (for example, first performance↔second performance).

According to various embodiments, in connection with performing operation 845, the processor 120 may perform an operation of identifying a rotating target display surface (or target display) (for example, a display surface that changes from the front surface to the rear surface as a result of rotation (hereinafter, referred to as first display surface) and/or a display surface that changes from the rear surface to the front surface (hereinafter, referred to as second display surface)), for example, and an operation of identifying the operating timepoint associated with the rotation.

According to an embodiment, if the user rotates the electronic device 101 in the fully folded state (for example, folding state) of the display 400, the processor 120 may identify the operating timepoint associated with the rotation based on at least one sensor (for example, gyro sensor and/or acceleration sensor). According to an embodiment, the processor 120 may acquire the angular velocity of the electronic device 101 rotating with regard to each axis (for example, x-axis, y-axis, or z-axis) based on at least one sensor (for example, gyro sensor). According to an embodiment, the clockwise velocity with regard to each axis may have a positive value, and the counterclockwise velocity with regard to each axis may have a negative value.

According to another embodiment, the processor 120 may acquire the magnitude of gravitational acceleration (for force) applied to the electronic device 101 with regard to each axis (for example, x-axis, y-axis, or z-axis) based on at least one sensor (for example, acceleration sensor or three-axis sensor).

According to an embodiment, during an operation of the electronic device 100 rotating from the fully folded state (for example, folding state), the processor 120 may acquire data (for example, sensing data) regarding directions in which the first display surface 410 of the first part 401 of the housing 405 and the second display surface 420 of the second part 403 thereof face, respectively, based on at least one sensor. According to an embodiment, the processor 120 may compare the acquired data with preconfigured third reference data (for example, reference data for identifying a third operating timepoint resulting from the third state (for example, timepoint of rotation in the folding state)) such that, if the acquired data corresponds to the third reference data, the operating timepoint associated with rotation of the display 400 is confirmed.

According to another embodiment, the at least one sensor may further include at least one of a touch sensor (for example, touch sensor 351 in FIG. 3) or a pressure sensor (not illustrated). For example, the processor 120 may use at least one of the touch sensor or the pressure sensor so as to determine the state in which the electronic device 101 is gripped by the user. According to an embodiment, the processor 120 may determine the state in which the electronic device 101 is gripped by the user based on at least one of the touch sensor or the pressure sensor, and may determine the front and rear surfaces in the folding state of the electronic device 101, based on the gripped state. For example, the electronic device 101 may determine the gripping mode (for example, lefthanded mode, righthanded mode, or both-handed mode) based on at least one of the point of touch of the user's finger (and/or palm) on at least one display surface, the area of touch, and/or the number of touch points, and may determine the front and rear surfaces according to the gripping mode.

According to an embodiment, the third reference data for identifying the third operating timepoint in the third state may be configured as a single piece of reference data that regards one surface (for example, front or rear surface) as a reference without distinguishing between the operating timepoint at which the display 400 switches from the front surface to the rear surface and the operating timepoint at which the display 400 switches from the rear surface to the front surface. According to an embodiment, in connection with the third reference data for identifying the third operating timepoint in the third state, the operating timepoint at which the display 400 switches from the front surface to the rear surface and the operating timepoint at which the display 400 switches from the rear surface to the front surface may be distinguished from each other, and respective pieces of reference data are configured therefor. For example, first data may be configured as third reference data with regard to the first display surface changing from the front surface to the rear surface, and second data may be configured as third reference data with regard to the second display surface changing from the rear surface to the front surface.

According to an embodiment, through the distinction between the first data and the second data, and based on rotation of the electronic device 101, the processor 120 may differentiate between the timepoint at which one display surface is deactivated and the timepoint at which the other display surface is activated. For example, with regard to the first display surface changing from the front surface to the rear surface, the processor 120 may deactivate the first display surface based on first data (for example, reference having a faster operating timepoint than second data); and with regard to the second display surface changing from the rear surface to the front surface, the processor 120 may activate the second display surface based on second data (for example, reference having a slower operating timepoint than first data). For example, the processor 120 may run activation of the second display surface changing from the rear surface to the front surface and deactivation of the first display surface changing from the front surface to the rear surface, with a time difference therebetween. For example, the processor 120 may process the deactivation operation prior to the activation process, based on the time difference between the first data and the second data.

According to various embodiments, based on the state of the display 400 (for example, display surface which operates as the front/rear surface, or which switches from the front/rear surface to the rear/front surface), the processor 120 may control activation or deactivation of the corresponding display surface. According to various embodiments, in connection with the application program operating on the display surface controlled to be activated or deactivated, the processor 120 may vary the performance mode for running the same according to the state of the display 400.

According to an embodiment, in operation 847, the processor 120 may change the mode related to running the application program with regard to the first display surface. According to an embodiment, the processor 120 may change the mode (for example, first or second mode) selected with regard to the first display surface to a different designated mode (for example, second mode).

According to an embodiment, changing the mode related to the first display surface may include an operation of changing the application program (for example, first application program) that is being executed (or operating) based on a first or second designated computing resource (for example, low-performance or high-performance execution) on the first display surface such that the same is executed based on the first designated computing resource (for example, low-performance execution). For example, the processor 120 may include an operation of changing the first mode selected with regard to the first application program operating on the first display surface to the second mode.

According to an embodiment, in operation 849, the processor 120 may change the mode related to running the application program with regard to the second display surface. According to an embodiment, the processor 120 may change the mode (for example, fourth mode) selected with regard to the second display surface to a different mode (for example, third or fourth mode).

According to an embodiment, changing the mode related to the second display surface may include an operation of changing the application program (for example, second application program) that is being executed (or operating) based on a first designated computing resource (for example, low-performance execution) on the second display surface such that the same is executed based on the first or second designated computing resource (for example, low-performance or high-performance execution). For example, the processor 120 may include an operation of changing the fourth mode selected with regard to the second application program operating on the second display surface to the third mode. According to various embodiments, operation 847 and operation 849 are not limited to the illustration in FIG. 8, and may proceed in a continuous or parallel manner (or approximately simultaneously).

According to an embodiment, in operation 851, the processor 120 may run respective application programs (for example, first and second application programs), based on respective changed modes, with regard to the first and second display surfaces. According to an embodiment, the processor 120 may run an application program by using a computing resource corresponding to the changed mode (for example, second mode) with regard to the first display surface, and may run an application program by using a computing resource corresponding to the changed mode (for example, third or fourth mode) with regard to the second display surface.

According to an embodiment, in operation 853, the processor 120 may display a user interface (for example, second user interface) on the second display surface. According to an embodiment, the processor 120 may display the second user interface related to the second application program on the second display surface.

According to various embodiments, referring to FIG. 8, the processor 120 may run the application program (for example, first application program) operating on the front surface (for example, first display surface) and the application program (for example, second application program) operating on the rear surface (for example, second display surface) according to different operating policies (or computing resources).

According to an embodiment, the processor 120 may utilize 100% of the performance of the electronic device 101 in the case of the first application program operating on the front surface, and may utilize a limited portion of the performance of the electronic device 101 in the case of the second application operating on the rear surface.

For example, if the first application program is operating by low-performance CPUs, and if the second application program is operating by high-performance CPUs, task migration or switching may proceed in response to folding of the display 400.

For example, at the timepoint of CPU scheduling related to the first application program executed on the front surface, 100% of the CPU/GPU maximum clock may be maintained, or no restriction may be imposed on use of other resources. However, at the timepoint of scheduling related to the second application program executed on the rear surface, the CPU/GPU maximum clock may be down-adjusted, and the level of the frames per second (FPS) of the user interface (for example, image) of the second application program and resource use may be limited.

For example, the first application program currently executed on the front surface may operate in the power normal mode, and the second application program may operate in the power saving mode. Likewise, if the second application program on the rear surface is switched to the front surface, operations of the application programs may be performed, with regard to the front/rear surface, according to the opposite of the operating policy described above.

According to various embodiments, with regard to the display 400, the electronic device 101 may partially control the display 400 based on a folding or unfolding operation. For example, during folding of the display 400, the electronic device 101 may deactivate (for example, partial off) the display and touch with regard to the display surface of the display 400 switching to the rear surface. According to an embodiment, after the folding is completed, the electronic device 101 may activate (for example, partial on) and operate the display and touch with regard to the display surface of the front surface.

According to various embodiments, in the case of the application program related to the display surface changed to the rear surface, the task of the application program may not be stopped (or ended), but may continually operate. For example, after folding of the display 400 is completed, the first application program on the first display surface and the second application program on the second display surface may be actually operating on the process, and the input/output (for example, display and touch input) may be partially deactivated with regard to the second display surface operating as the rear surface, thereby reducing current consumption.

According to various embodiments, if the electronic device 101 is rotated by the user in the folding state of the display 400, completion of the rotation may be determined based on data acquired from at least one sensor, and the display surface switching to the rear surface and the application program executed based on the corresponding display surface may be run based on the above-mentioned operations.

Figure 9:
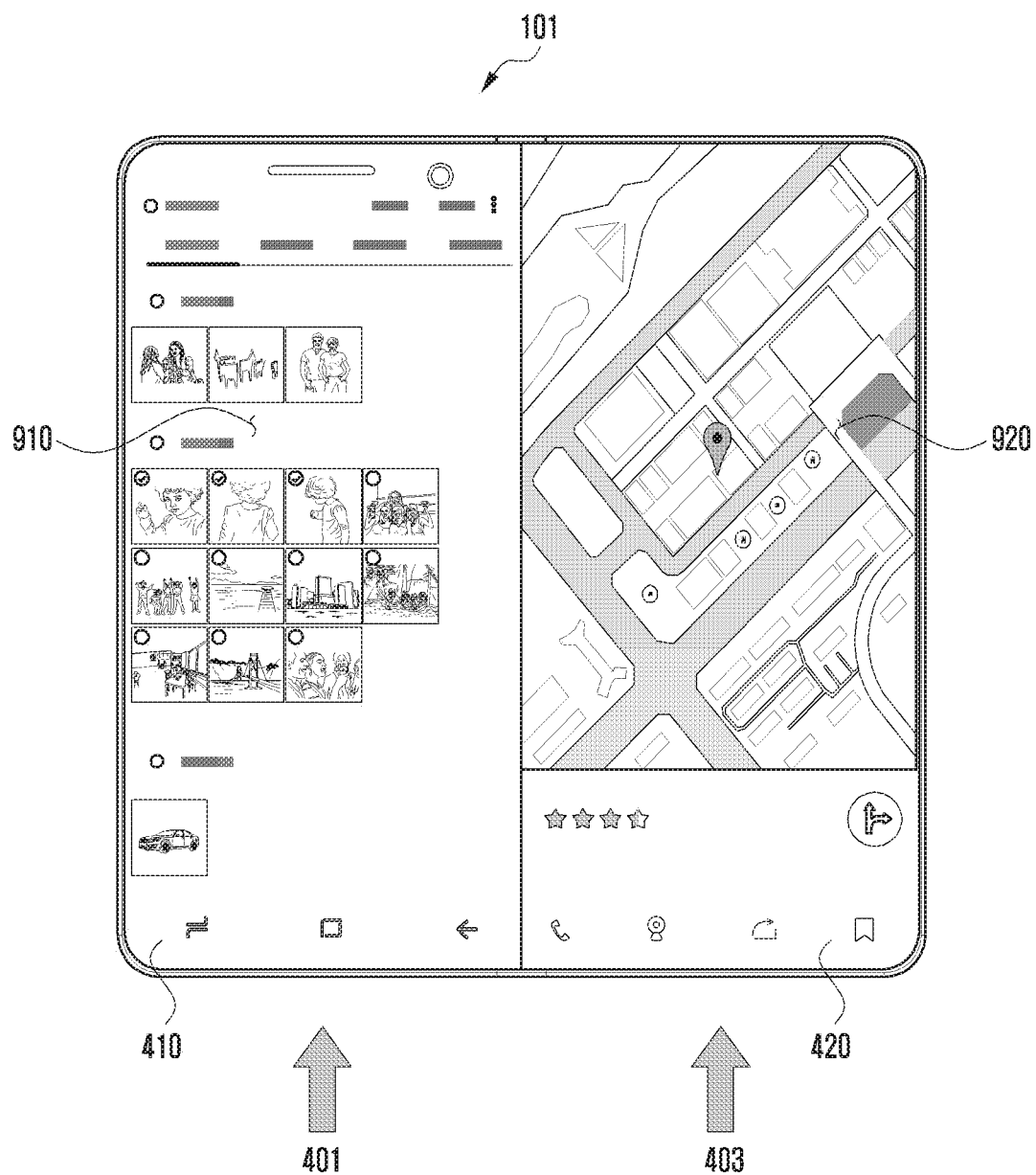
FIG. 9 is a diagram illustrating an example of running a display based on the state of the display in connection with an electronic device according to an embodiment of the disclosure.
Figure 10:
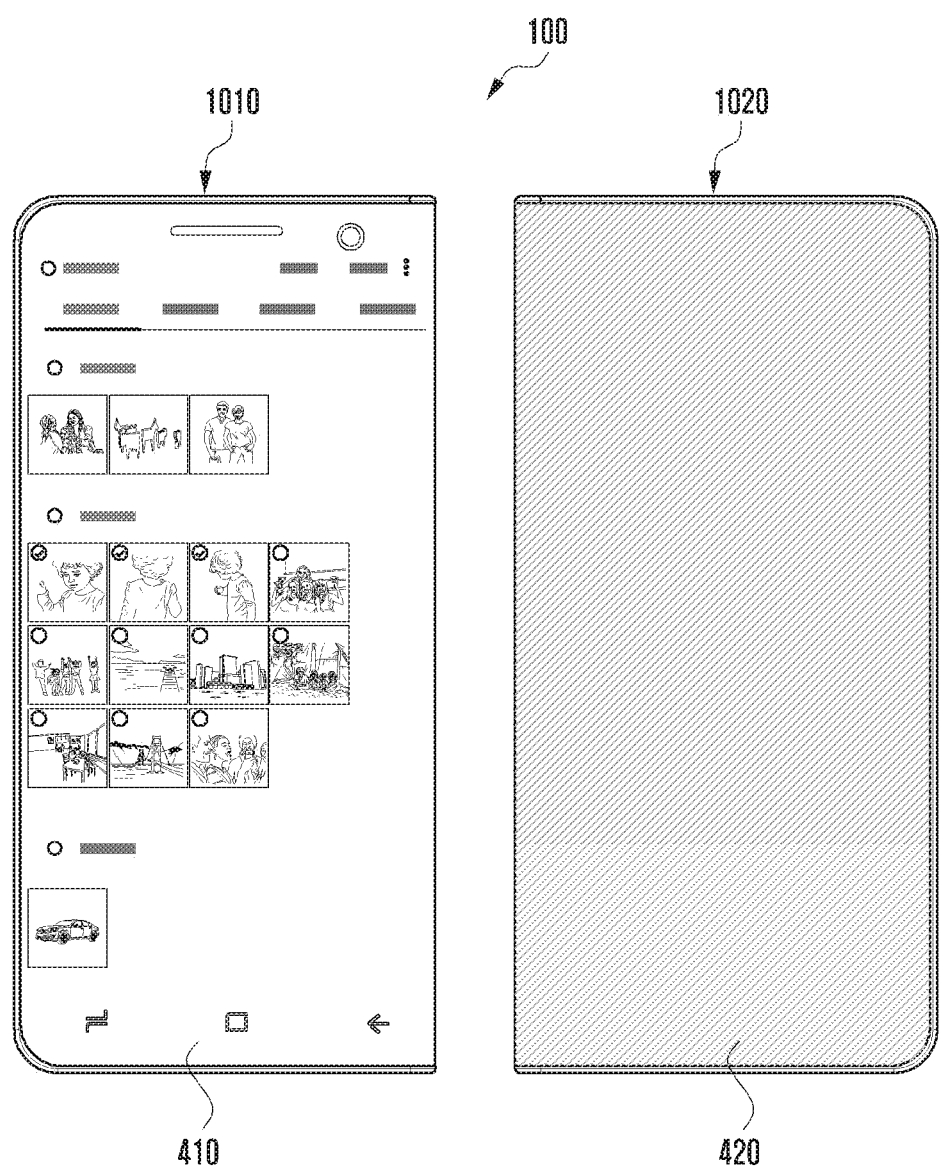
FIG. 10 is a diagram illustrating an example of running a display based on the state of the display in connection with an electronic device according to an embodiment of the disclosure.
Figure 11:
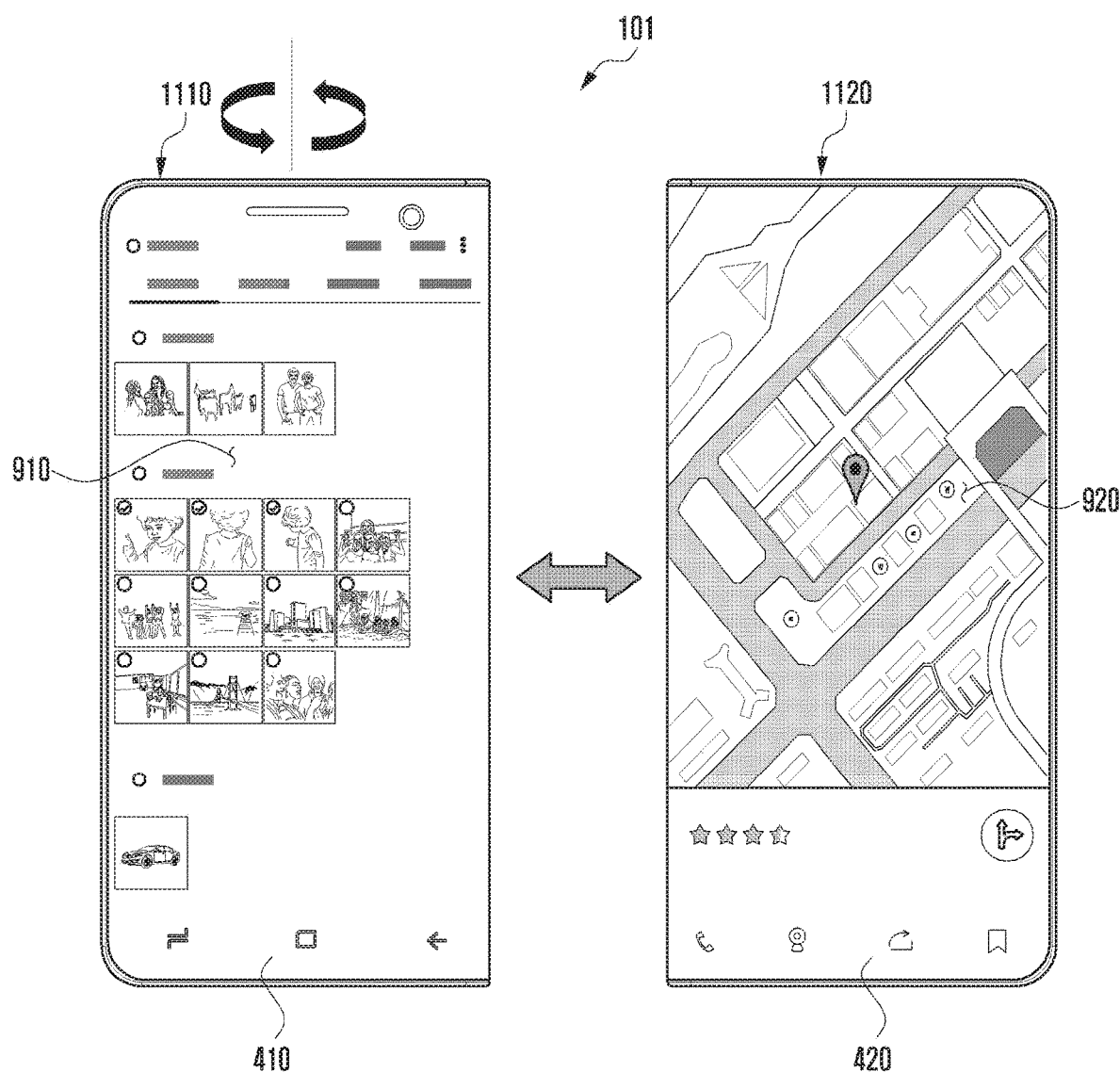
FIG. 11 is a diagram illustrating an example of running a display based on the state of the display in connection with an electronic device according to an embodiment of the disclosure.

FIG. 9 is a diagram illustrating examples of running a display 400 based on the state of the display 400 in connection with electronic devices 101 according to an embodiment of the disclosure, FIG. 10 is a diagram illustrating examples of running a display 400 based on the state of the display 400 in connection with electronic devices 101 according to an embodiment of the disclosure, and FIG. 11 is a diagram illustrating examples of running a display 400 based on the state of the display 400 in connection with electronic devices 101 according to an embodiment of the disclosure.

According to an embodiment, FIG. 9 may illustrate an example of operation in the first state of FIG. 8. According to an embodiment, FIG. 10 may illustrate an example of operation in the second state of FIG. 8. According to an embodiment, FIG. 11 may illustrate an example of operation in the third state of FIG. 8.

Referring to FIG. 9, FIG. 9 may illustrate a state in which the display 400 is unfolded (for example, unfolding state). According to an embodiment, the display 400 of the electronic device 101 may operate based on a distinction between the first display surface 410 of the first part 401 and the second display surface 420 of the second part 403. According to an embodiment, the electronic device 101 may execute a first application program including a first user interface 910 on the first display surface 410, and may execute a second application program including a second user interface 920 on the second display surface 420. According to an embodiment, the electronic device 101 may configure the first display surface 410 based on a first partial resolution (for example, about 1076×1536) of the entire resolution (for example, about 2152×1536) of the display 400, and may configure the second display surface 420 based on a second partial resolution (for example, about 1076×1536) thereof.

According to an embodiment, if the user changes the unfolding state of the display 400 to the folding state as illustrated in FIG. 9, one display surface may operate as the rear surface. For example, the first display surface 410 and the second display surface 420 may be both operating as front surfaces in the state illustrated in FIG. 9, and after a change to the folding state, one of the first display surface 410 and the second display surface 420 may be folded and changed to the rear surface. It will be assumed in the following description that the second display surface 420 is folded and then operates as the rear surface, an example of which is illustrated in FIG. 10.

Referring to FIG. 10, the screen 1010 may correspond to an operating state of the first display surface 410 operating as the front surface as a result of folding of the display 400, and the screen 1020 may correspond to an operating state of the second display surface 420 operating as the rear surface as a result of folding of the display 400.

On the screen 1010, the first display surface 410 may maintain the operating state of FIG. 9. For example, the first display surface 410 may be displaying the first user interface 910 of the first application program. On the screen 1020, the second display surface 420 may be deactivated (or deactivated in terms of power or performance). For example, the input/output function of the second display surface 420 may be deactivated. According to an embodiment, the electronic device 101 may partially activate (for example, partial on) the display 400 and may partially deactivate (for example, partial off) the same.

According to an embodiment, after folding of the display 400 is completed, the first display surface 410 operating as the front surface may operate in a state in which a touch input is possible, while displaying the first user interface 910.

According to an embodiment, after folding of the display 400 is completed, the second display surface 420 operating as the rear surface may operate in a state in which power supply is at least partially blocked (for example, the second display surface 420 area of the display 400 is powered off), and input/output (for example, display and touch) is accordingly limited.

According to an embodiment, if the second display surface 420 is deactivated, the processor 120 may not stop the task of the second application program on the second display surface 420, and may maintain the operating state continuously. For example, even after folding is completed, the first and second application programs may be actually operating on the process, and input/output through the second display surface 420 of the display 400 may be deactivated. For example, if the display 400 is folded while the resolution of the display 400 is, for example, 2152×1536, then the processor 120 may deactivate the input/output function with regard to the second partial resolution (1076×1536) area of the second display 420, in which the second application program is operating. According to an embodiment, the state with the resolution 2152×1536 may correspond to a state in which a multi-window is configured based on, for example, the resolution 1076×1536 (for example, first partial resolution) of the first display surface 410 and the resolution 1076×1536 (for example, second partial resolution) of the second display surface 420.

Referring to FIG. 11, FIG. 11 may correspond to a case in which, while the display 400 is folded (for example, folding state in FIG. 10), the front and rear surfaces of the display 400 switch to each other as a result of rotation of the electronic device 101.

According to an embodiment, the screen 1110 may correspond to a case in which the first display surface 410 operates as the front surface and displays the first user interface 910 of the first application program. According to an embodiment, on the screen 1110, the second display surface 420 may operate as the rear surface and may be in a deactivated state. According to an embodiment, the first display surface 410 may have switched to an activated state, and the first application program may be operating in the power normal mode. According to an embodiment, the second display surface 420 may have switched to a deactivated state, and the second application program may be operating in the power saving mode (or in the background).

According to an embodiment, the screen 1120 may correspond to a state in which, as a result of rotation of the electronic device 101, the front and rear surfaces thereof have switched (or inverted). For example, the screen 1120 may correspond to a case in which the second display surface 420 switches to the front surface and then operates, and displays the second user interface 920 of the second application program.

According to an embodiment, on the screen 1120, the first display screen 410 may have switched to the rear surface and may then operate in a deactivated state. According to an embodiment, the second display surface 420 may have switched to an activated state, and the second application program may be operating in the power normal mode. According to an embodiment, the first display surface 410 may have switched to a deactivated state, and the first application program may be operating in the power saving mode (or executed in the background).

Figure 12:
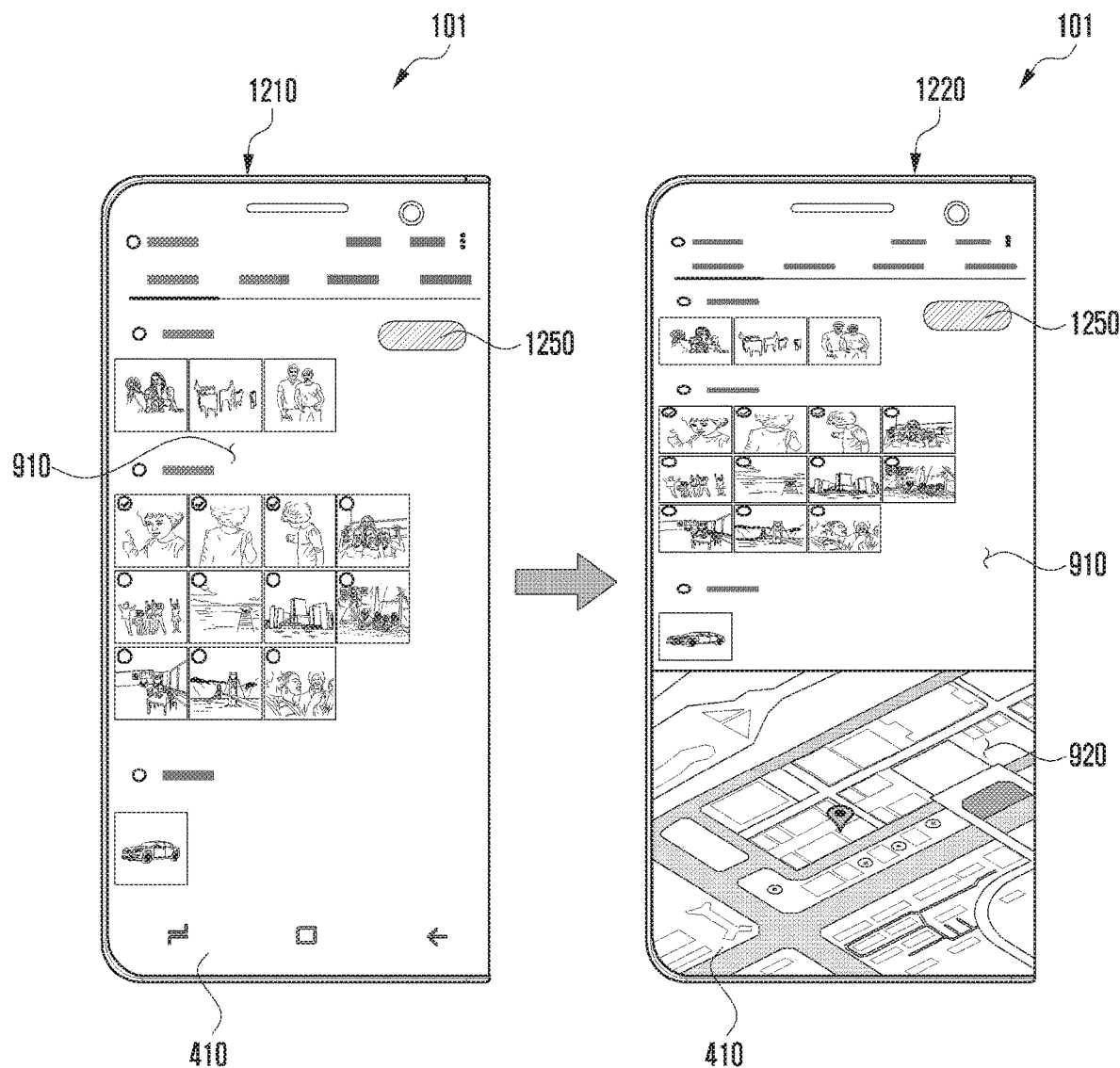
FIG. 12 is a diagram illustrating an example of running a display in connection with an electronic device according to an embodiment of the disclosure.

FIG. 12 is a diagram illustrating an example of running a display 400 in connection with an electronic device 101 according to an embodiment of the disclosure.

According to an embodiment, FIG. 12 may illustrate a case in which, while displaying a user interface of an application program (for example, first application program) on the front surface, the electronic device 101 provides information regarding the operating situation of an application program (for example, second application program) operating on the rear surface, based on a user input.

Referring to FIG. 12, the screen 1210 may correspond to a state in which the user is using the first application program through the first display surface 410 operating as the front surface. According to an embodiment, while displaying the first user interface 910 of the first application program through the first display surface 410 on the screen 1210, the processor 120 may acquire a user input for checking the operating situation of the second application program on the second display surface 420 operating as the rear surface.

According to an embodiment, the user input for checking the operating situation may be acquired, for example, based on a switching object 1250 provided through at least a partial area of the front surface (for example, first display surface 410). For example, the first user interface 910 on the first display surface 410 operating as the front surface may include the switching object 1250.

According to an embodiment, the switching object 1250 may be provided if there is an application program (for example, second application program) operating (or being executed) in the background (or with a low performance) on the rear surface (for example, second display surface 420). For example, if the second application program is being executed in the background on the rear surface in the folding state of the display 400, the processor 120 may provide, through the switching object 1250, information regarding the state of execution of the second application program on the rear surface, through at least a partial area of the front surface.

According to an embodiment, upon receiving a user input based on the switching object 1250 on the screen 1210, the processor 120 may provide the second user interface 920 of the second application program on the rear surface (for example, second display surface 420), through the front surface (for example, first display surface 410) on the screen 1220.

According to an embodiment, based on a user input made through the switching object 1250 on the screen 1220, the processor 120 may provide information (for example, second user interface 920) regarding the second application program on the rear surface (for example, second display surface 420) in a partial area on the front surface (for example, first display surface 410).

According to an embodiment, the processor 120 may divide the front surface (for example, first display surface 410) into multiple windows, may display the first user interface 910 related to the first application program on the front surface (for example, first display surface 410) in the first divided area, and may display the second user interface 920 related to the second application program on the rear surface (for example, second display surface 420) in the second divided area. According to an embodiment, besides the multiple windows, the processor 120 may also provide the second user interface 920 related to the second application program based on a popup window. For example, the processor 120 may form a popup window overlapping (or overlaying) the first user interface 910, and may provide the second user interface 920 in the popup window.

According to an embodiment, referring to FIG. 12, if the user selects the switching object 1250 to check the progress related to the rear surface, the user may be provided with information regarding the progress related to the rear surface, through a multi-window or popup window on the front surface. For example, the first user interface 910 of the first application program on the front surface may be displayed in a specific area on the upper (or lower) end of the front surface, and the second user interface 920 of the second application program on the rear surface may be displayed on the lower (or upper) end of the front surface.

According to an embodiment, the switching object 1250 may be for the purpose of providing, on the front surface, state information regarding the application program on the rear surface. According to an embodiment, in the case illustrated in FIG. 12, the state related to the application program on the front surface may be maintained, based on the switching object 1250, and state information regarding the application program on the rear surface may be provided through a partial area of the front surface.

According to an embodiment, the switching object 1250 may be configured to switch the application programs on the front and rear surfaces. For example, based on a user input made through the switching object 1250, the processor 120 may switch the first application program on the front surface to the rear surface (or switch the same to be executed in the background), and may switch the second application program on the rear surface to the front surface and then display the same. For example, the processor 120 may switch, through the front surface, the second application program that has been executed on the rear surface such that the same is executed on the front surface, thereby displaying the second user interface 920 of the second application program through the entire area of the front surface. For example, the switching object 1250 may be provided to switch (or toggle) respective application programs on the front and rear surfaces.

According to an embodiment, the switching object 1250 may be provided differently on the screen 1210 and on the screen 1220. According to an embodiment, on the screen 1210, the switching object 1250 may be configured and provided as an opening object having a function for opening the application program related to the rear surface on the front surface, and a function for indicating the opening function. According to an embodiment, on the screen 1220, the switching object 1250 may be configured and provided as a closing object having a function for closing the application program related to the rear surface, which is opened on the front surface, and a function for indicating the closing function. According to an embodiment, if the switching object 1250 is provided as the closing object, the switching object 1250 may be provided through the area on the front surface, in which the second user interface 920 of the application program related to the rear surface is displayed.

According to an embodiment, the user input related to the switching object 1250 may be replaced with another type of designated user input. For example, instead of providing the switching object 1250 on the screen 1210, state information regarding the application program on the rear surface may be provided, or the application programs may be switched to each other, based on a specific user input (for example, voice input, gesture input, or designated hardware button input) configured to perform a function corresponding to the switching object 1250 (or capable of generating a command such that a function corresponding to the switching object 1250 is performed).

Figure 13:
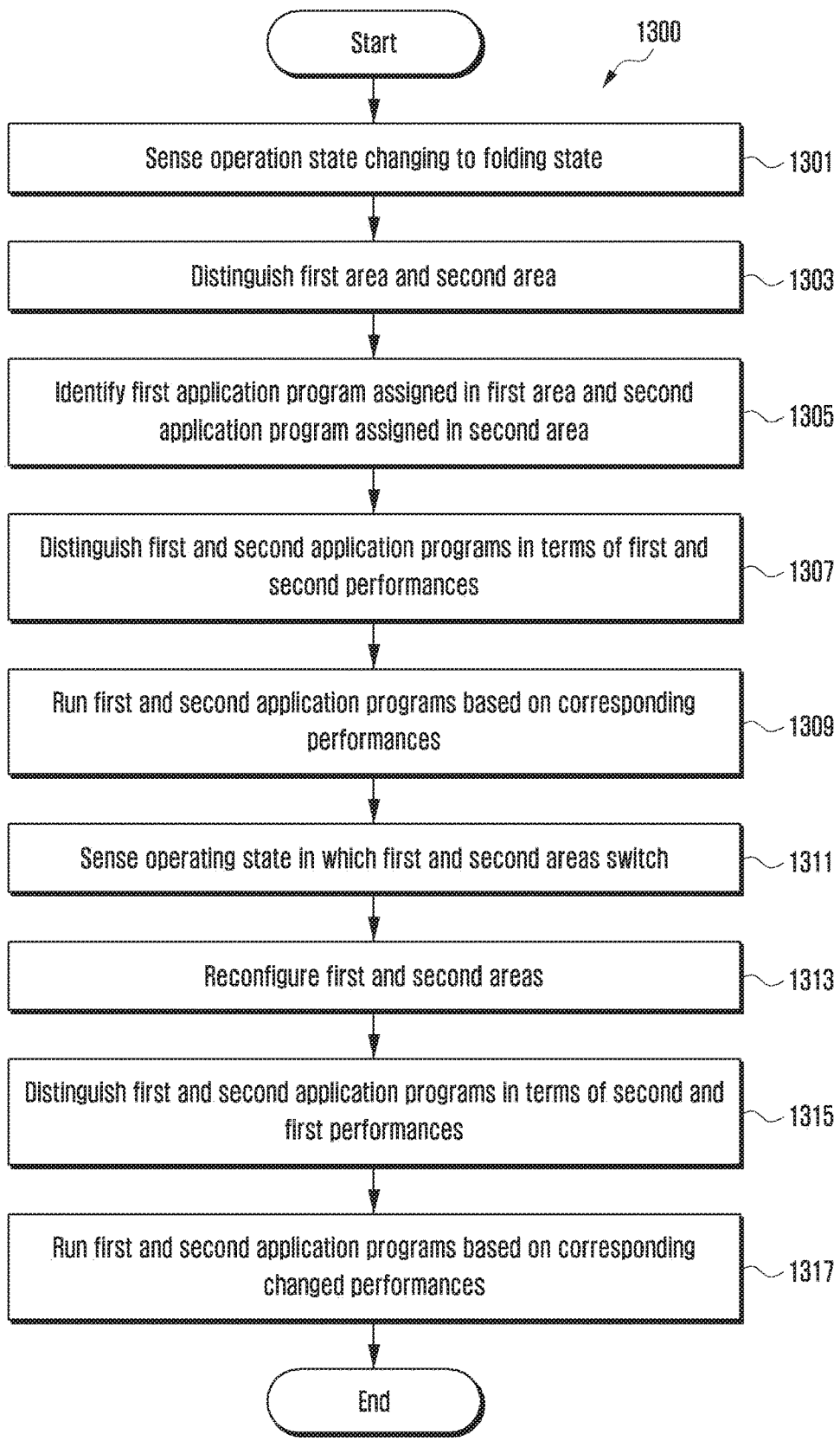
FIG. 13 is a flowchart illustrating a method for operating an electronic device according to an embodiment of the disclosure.

FIG. 13 is a flowchart 1300 illustrating a method for operating an electronic device 101 according to an embodiment of the disclosure.

According to an embodiment, FIG. 13 may illustrate an example of differently configuring (or selecting) a computing resource (hereinafter, referred to as first performance) related to running an application program (hereinafter, referred to as first application program) currently executed on the front surface (hereinafter, referred to as first area) and a computing resource (hereinafter, referred to as second performance) related to running an application program (hereinafter, referred to as second application program) currently executed on the rear surface (hereinafter, referred to as second area), and then running respective application programs corresponding to respective display surfaces.

Referring to FIG. 13, according to an embodiment, in operation 1301, the processor 120 may sense an operating state in which the display 400 switches from an unfolding state to a folding state. According to an embodiment, the processor 120 may identify a state change from the unfolding state to the folding state by sensing a state in which the user grips or moves the electronic device 101, based on at least one sensor (for example, sensor module 176 in FIG. 1). According to an embodiment, the at least one sensor may be positioned inside the housing 405 and operably connected to the processor 120. According to an embodiment, the at least one sensor may sense a state in which the user moves or grips the electronic device 101, and may provide the processor 120 with data (for example, sensor data) regarding the sensed state.

According to an embodiment, in operation 1303, the processor 120 may distinguish between the first area (for example, front surface) and the second area (for example, rear surface) at least partially based on the data. According to an embodiment, the processor 120 may distinguish, among the entire area of the display 400, the first area (for example, first display surface 410 in FIG. 4) operating as the front surface and the second area (for example, second display surface 420 in FIG. 4) operating as the rear surface. According to an embodiment, like at least a part of the above-described activation/deactivation operation, the first area of the display 400 may be in an activated state in which input/output is possible, and the second area may be in a deactivated in which input/output is limited (or impossible).

According to an embodiment, in operation 1305, the processor 120 may identify a first application program assigned (currently executed) in the first area and a second application program assigned (or currently executed) in the second area. For example, based on a distinction between the first and second areas, the processor 120 may identify the first application program executed in the first area and may identify the second application program executed in the second area. According to an embodiment, the first user interface of the first application program may be currently displayed through the first area. According to an embodiment, the second user interface of the second application program may not be displayed in the deactivated second area (or executed with a lower performance or in the background).

According to an embodiment, in operation 1307, the processor 120 may distinguish between the first performance and the second performance with regard to the first application program in the first area and the second application program in the second area. According to an embodiment, each application program may operate based on the first or second performance according to the specification that can be executed for each application program.

According to an embodiment, it may be assumed in FIG. 13, for example, that the first performance uses the entire computing resource (or capability) of the electronic device 101 (for example, high performance), and the second performance uses a portion (or part) of the computing resource (or capability) of the electronic device 101 (for example, low performance). For example, the second performance may have a lower performance (or specification) than the first performance (for example, low performance), and may consume less power than the first performance.

For example, the first application program in the first area may be an application program currently used by the user (for example, application program operating on the display surface (for example, front surface) viewed by the user), and may require input/output support for interaction with the user. For example, the second application program in the second area may be an application program which is not used by the user, and which is executed in the background (for example, application program operating on the display surface (for example, rear surface) facing away from the display surface (for example, front surface) viewed by the user), and may require no interaction with the user.

According to an embodiment, the processor 120 may configure (or determine) the first application program in the first area to be run based on the first performance, and may configure (or determine) the second application program in the second area to be run based on the second performance. According to another embodiment, if the first application program in the first area is run based on the second performance, the processor 120 may configure the first application program in the first area to be run based on the second performance. For example, the application program operating on the front surface may be run based on a designated performance (for example, first or second performance), and the application operating on the rear surface may be run based on a low performance (for example, second performance) for lower power consumption.

According to an embodiment, in operation 1309, the processor 120 may independently run the first and second application programs based on corresponding performances (for example, first or second performance), respectively. For example, the processor 120 may run the first application program in the first area based on the first performance, and may run the second application program in the second area based on the second performance.

According to an embodiment, in operation 1311, the processor 120 may sense an operating state in which the first and second areas switch. According to an embodiment, the processor 120 may sense a state in which the user rotates the front/rear surface of the electronic device 101 (for example, operation of the user inverting the electronic device 101 in the folding state) based on at least one sensor (for example, sensor module 176 in FIG. 1), thereby identifying an operating state in which the first area on the front surface switches to the rear surface, and the second area on the rear surface switches to the front surface.

According to an embodiment, in operation 1313, the processor 120 may reconfigure the first and second areas. For example, based on switching between the first and second areas, the processor 120 may reconfigure the second area, which has been configured as the rear surface prior to rotation, as the front surface, and may reconfigure the first area, which has been configured as the front surface prior to rotation, as the rear surface.

According to an embodiment, in operation 1315, the processor 120 may distinguish the first application program in the first area and the second application program in the second area in terms of the second performance and the first performance, respectively. According to an embodiment, the first application program in the first area changed to the rear surface may switch to an application program which is not used by the user, and which is executed in the background (or performed based on a low performance). According to an embodiment, the second application program in the second area changed to the front surface may switch to an application program currently available to the user.

According to an embodiment, the processor 120 may configure (or determine) the first application program in the first area to be run based on the second performance, and may configure (or determine) the second application program in the second area to be run based on the first performance. According to another embodiment, if the second application program in the second area changed to the front surface is an application program run based on the second performance, the processor 120 may configure the second application program in the second area to be run based on the second performance. For example, the application program operating on the front surface may be run based on a designated performance (for example, first or second performance), and the application operating on the rear surface may be run based on a low performance (for example, second performance) for lower power consumption.

According to an embodiment, in operation 1317, the processor 120 may independently run the first and second application programs based on corresponding performances (for example, second or first performance), respectively. For example, the processor 120 may run the first application program in the first area that has switched to the rear surface, based on the second performance, and may run the second application program in the second area that has switched to the front surface, based on the first performance.

Figure 14:
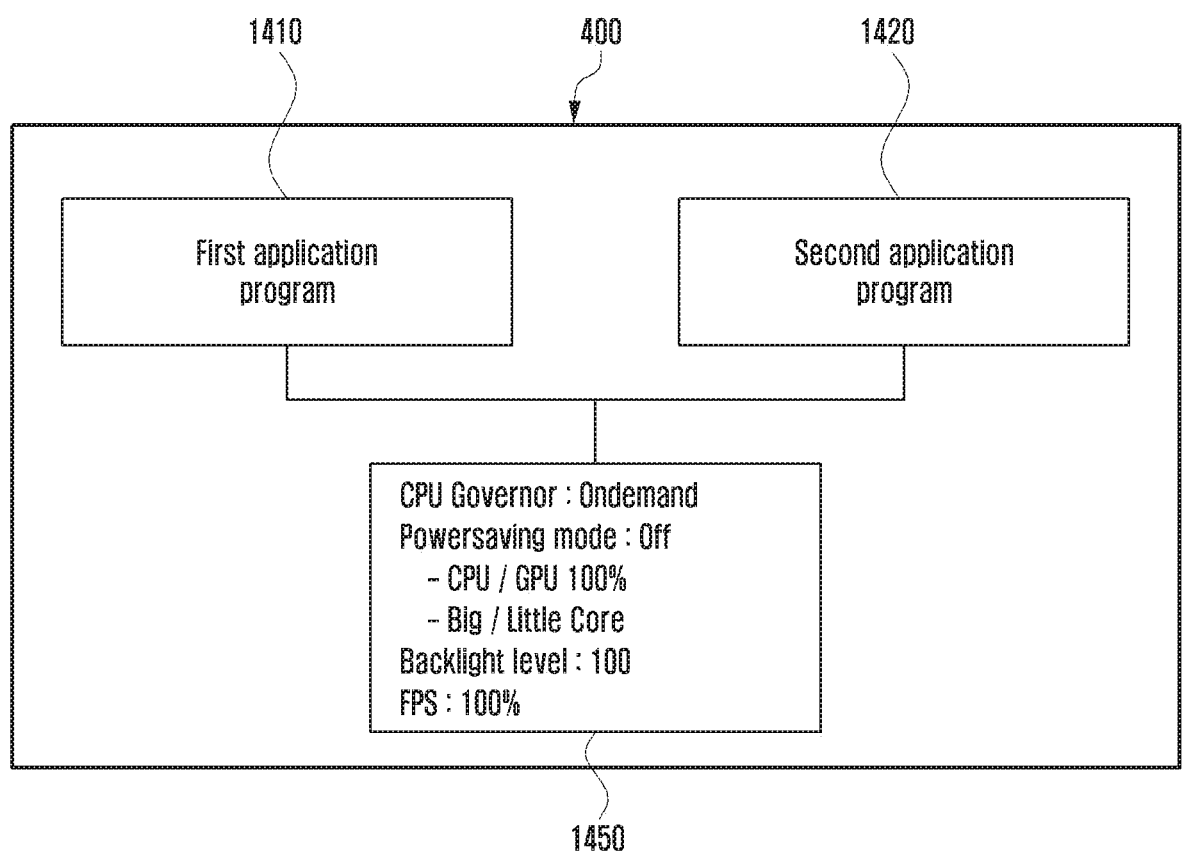
FIG. 14 is a diagram illustrating an example of running an application program in connection with an electronic device according to an embodiment of the disclosure.
Figure 15:
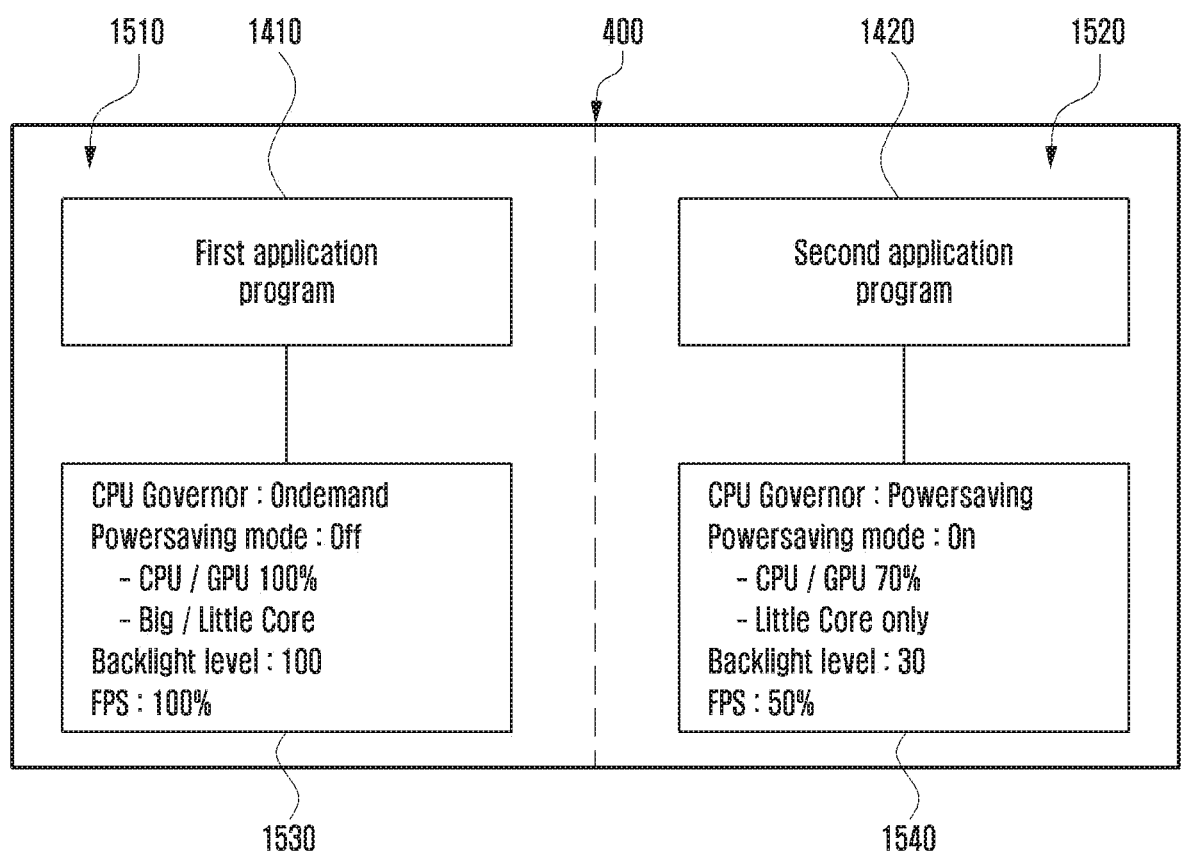
FIG. 15 is a diagram illustrating an example of running an application program in connection with an electronic device according to an embodiment of the disclosure.

FIG. 14 is a diagram illustrating examples of running an application in an electronic device 101 according to an embodiment of the disclosure, and FIG. 15 is a diagram illustrating examples of running an application in an electronic device 101 according to an embodiment of the disclosure.

According to an embodiment, FIG. 14 and FIG. 15 may illustrate examples of assigning (or running) different performances (for example, computing resources) for running the application program operating on the front surface and the application program operating on the rear surface in FIG. 13. For example, FIG. 14 and FIG. 15 may illustrate examples of running an application program after configuring the performance thereof according to the display surface (for example, front or rear surface) on which the application program operates.

Referring to FIG. 14, FIG. 14 may illustrate a case in which, in the unfolding state of the display 400, the full screen (for example, first display surface 410 and second display surface 420) of the display 400 operates as the front surface (for example, full screen mode). According to an embodiment, referring to FIG. 14, the electronic device 101 may run the first application program 1410 in the first area (for example, first display surface 410 in FIG. 5) of the display 400 and the second application program 1420 in the second area (for example, second display surface 420 in FIG. 5) thereof, based on a designated performance 1450. According to an embodiment, the electronic device 101 may independently (or individually) run the first application program 1410 in the first area and the second application program 1420 in the second area.

According to an embodiment, with regard to the first application program 1410 and the second application program 1420 currently executed on the front surface, the electronic device 101 may maintain about 100% of the computing resource at the timepoint of scheduling of the computing resource (for example, CPU), or may assign (or run) other resources with no restriction on using the same. For example, as illustrated in the element 1450, with regard to running the first application program 1410 and the second application program 1420 currently executed on the front surface, the electronic device 101 may configure the CPU/GPU at the maximum clock (for example, CPU/GPU 100%) in a power normal mode (for example, power saving mode off), may use both the big core and the little core, may configure the backlight level at the maximum level (for example, backlight level: 100), and may use the maximum frames per second (FPS) (for example, FPS: 100%).

According to an embodiment, referring to FIG. 14, the electronic device 101 may configure the same operating policy and accordingly run the first application program 1410 and the second application program 1420 operating on the front surface. According to an embodiment, the electronic device 101 may configure different operating policies and accordingly run the first application program and the second application program operating on the front surface. For example, the application programs operating on the front surface may be run by computing resources according to different policies, based on the specifications thereof.

Referring to FIG. 15, FIG. 15 may illustrate a case in which, in the folding state of the display 400, the first area 1510 (for example, first display surface 410 in FIG. 4) of the display 400 operates as the front surface, and the second area 1520 (for example, second display surface 420 in FIG. 4) operates as the rear surface. According to an embodiment, referring to FIG. 15, the electronic device 101 may run the first application program 1410 in the first area 1510 of the display 400 and the second application program 1420 in the second area 1520 based on different designated performances 1530 and 1540, respectively. According to an embodiment, the electronic device 101 may independently (or individually) run the first application program 1410 in the first area and the second application program 1420 in the second area.

According to an embodiment, with regard to the first application program 1410 in the first area 1510, which is currently executed on the front surface, the electronic device 101 may maintain about 100% of the computing resource at the timepoint of computing resource scheduling, or may assign (or run) other resources with no restriction on using the same. For example, with regard to running the second application program 1420 in the second area 1520, which is currently executed on the rear surface, the electronic device 101 may partially assign (or run) the computing resource at the timepoint of computing resource scheduling.

According to an embodiment, as illustrated in the element 1530, with regard to running the first application program 1410 currently executed on the front surface, the electronic device 101 may configure the CPU/GPU at the maximum clock (for example, CPU/GPU 100%) in a power normal mode (for example, power saving mode off), may use both the big core and the little core, may configure the backlight level at the maximum level (for example, backlight level: 100), and may use the maximum frames per second (FPS) (for example, FPS: 100%).

According to an embodiment, as illustrated in the element 1540, with regard to running the second application program 1420 currently executed on the rear surface, the electronic device 101 may configure, through downward adjustment, the maximum CPU/GPU clock (for example, CPU/GPU 70%) in a power saving mode (for example, power saving mode on), may use the little core only, may decrease the backlight level from the maximum level (for example, backlight level: 30), and may limitedly use the FPS (for example, FPS: 50%).

According to an embodiment, referring to FIG. 15, the electronic device 101 may configure different operating policies and accordingly run the first application program 1410 operating on the front surface and the second application program 1420 operating on the rear surface. For example, the electronic device 101 may run the first application program 1410 operating on the front surface with about 100% of the performance of the electronic device 101, and may run the second application program 1420 operating on the rear surface with a limited performance of the electronic device 101. For example, the electronic device 101 may run the application program 1410 operating on the front surface in the power normal mode, and may run the second application program 1420 operating on the rear surface in the power saving mode.

According to an embodiment, if the first area 1510 on the front surface and the second area 1520 on the rear surface switch, the electronic device 101 may switch the operating policies and accordingly run the first application program 1410 and the second application program 1420. For example, the electronic device 101 may run the second application program 1420, which has been switched to operate on the front surface, in the power normal mode, and may run the first application program 1410, which has been switched to operate on the rear surface, in the power saving mode.

Figure 16:
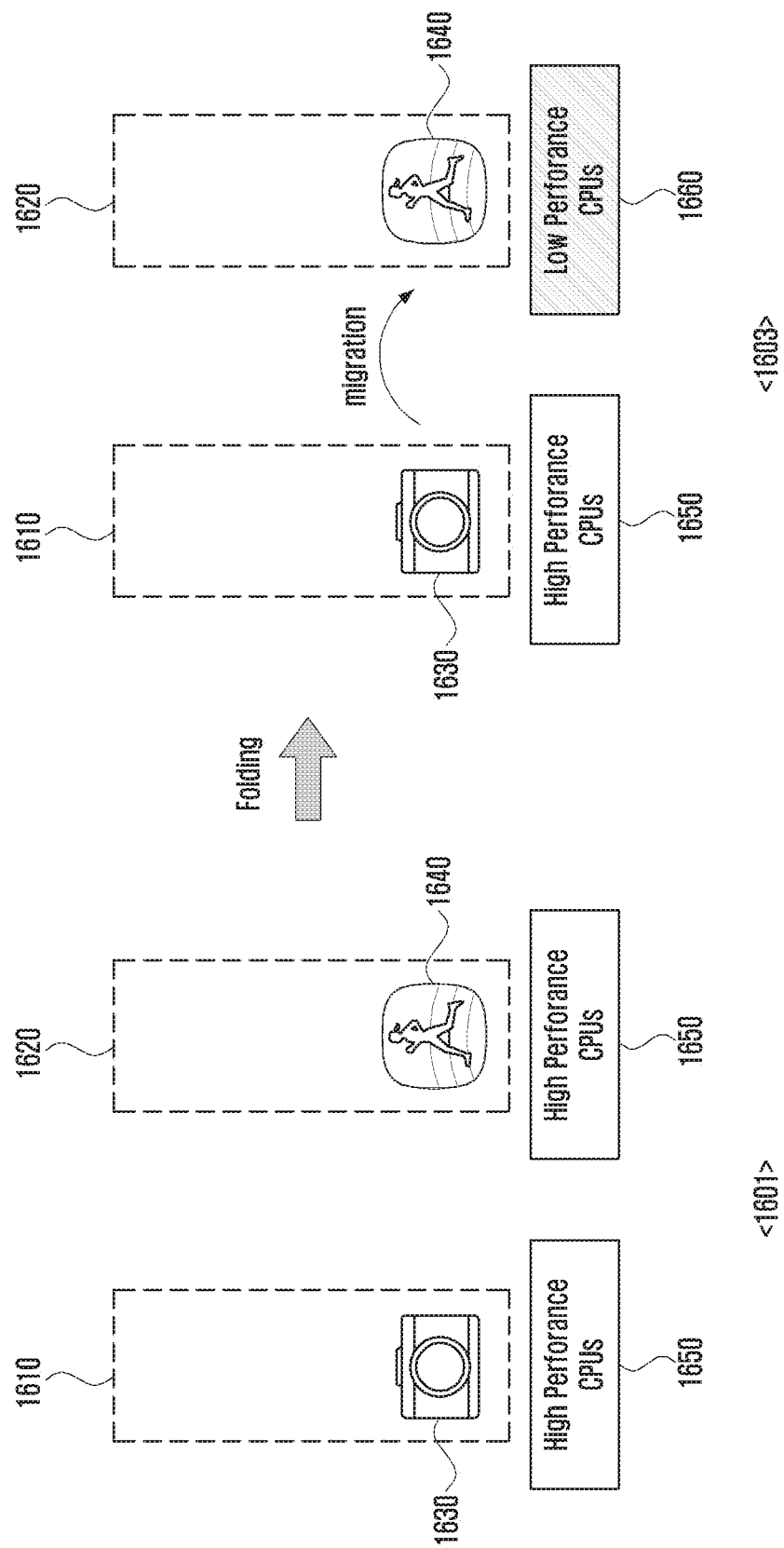
FIG. 16 is a diagram illustrating an example of running an application program in connection with an electronic device according to an embodiment of the disclosure.
Figure 17:
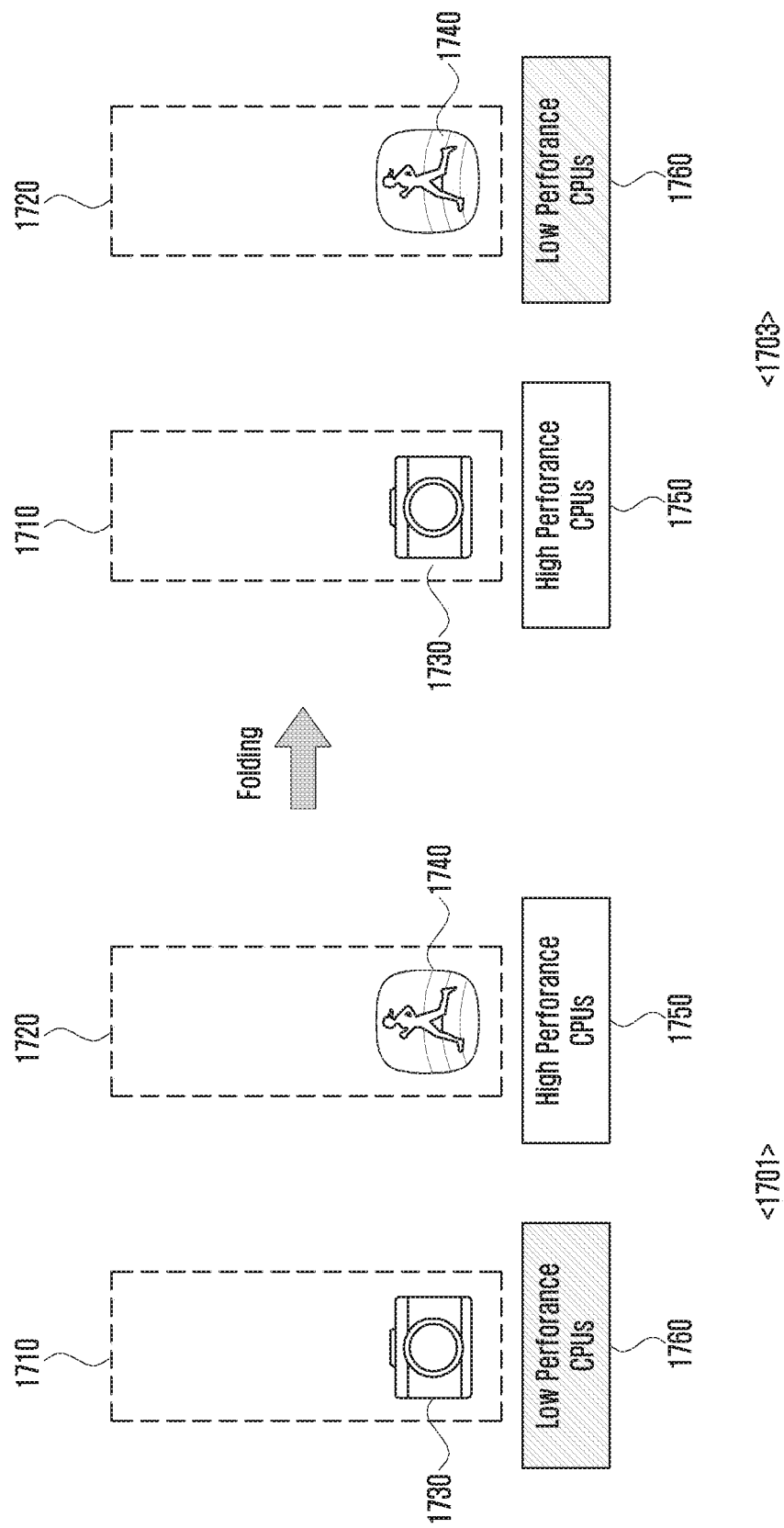
FIG. 17 is a diagram illustrating an example of running an application program in connection with an electronic device according to an embodiment of the disclosure.

FIG. 16 is a diagram illustrating examples of running an application program in an electronic device 101 according to an embodiment of the disclosure, and FIG. 17 is a diagram illustrating examples of running an application program in an electronic device 101 according to an embodiment of the disclosure.

According to an embodiment, FIG. 16 and FIG. 17 may illustrate examples of assigning (or running) different performances (for example, computing resources) for running the application program operating on the front surface and the application program operating on the rear surface in FIG. 15. For example, FIG. 16 and FIG. 17 may illustrate examples of running an application program after differently configuring the performance thereof according to the display surface (for example, front or rear surface) on which the application program operates, during folding of the display 400.

Referring to FIG. 16, FIG. 16 may illustrate a case in which, in the unfolding state 1601 of the display 400, both the first area 1610 (for example, first display surface 410 in FIG. 4) of the display 400 and the second area 1620 (for example, second display 420 in FIG. 4) operate as the front surface; and if the display 400 changes to the folding state 1603, the first area 1610 operates as the front surface, and the second area 1620 operates as the rear surface.

According to an embodiment, referring to FIG. 16, FIG. 16 may illustrate a case in which, in the unfolding state 1601 of the electronic device 101, the first application program 1630 operates through the first area 1610 with a first performance 1650 (for example, high-performance CPUs), and the second application program 1640 operates through the second area 1620 with the first performance 1650. According to an embodiment, if the display 400 changes the operating state from the unfolding state 1601 to the folding state 1603, the electronic device 101 may maintain the first application program 1630 in the first area 1610 so as to operate with the first performance 1650, and may run the second application program 1640 in the second area 1620 after an assignment change (for example, migration) from the first performance 1650 to the second performance 1660 (for example, low-performance CPUs).

According to an embodiment, the electronic device 101 may configure different operating policies and accordingly run the first application program 1630 operating on the front surface and the second application program 1640 operating on the rear surface. For example, the electronic device 101 may run the application program 1630 operating on the front surface with about 100% of the performance of the electronic device 101, and may run the second application program 1640 operating on the rear surface with a limited performance of the electronic device 101.

For example, referring to FIG. 16, in the unfolding state 1601, the first application program 1630 in the first area 1610 and the second application program 1640 in the second area 1620 may operate with the first performance 1650 (for example, high-performance CPUs); and if the unfolding state 1601 changes to the folding state 1603, the performance of the second application program 1640 in the second area 1620 operating as the rear surface may migrate from the first performance 1650 to the second performance 1660 (for example, low-performance CPUs).

Referring to FIG. 17, FIG. 17 may illustrate a case in which, in the unfolding state 1701 of the display 400, both the first area 1710 (for example, first display surface 410 in FIG. 4) of the display 400 and the second area 1720 (for example, second display 420 in FIG. 4) operate as the front surface; and if the display 400 changes to the folding state 1703, the first area 1710 operates as the front surface, and the second area 1720 operates as the rear surface.

According to an embodiment, referring to FIG. 17, FIG. 17 may illustrate a case in which, in the unfolding state 1701 of the electronic device 101, the first application program 1730 operates through the first area 1710 with a second performance 1760 (for example, low-performance CPUs), and the second application program 1740 operates through the second area 1720 with a first performance 1750 (for example, high-performance CPUs).

According to an embodiment, if the electronic device 101 simultaneously runs the first application program 1730 and the second application program 1740 based on the first area 1710 and the second area 1720 in the unfolding state 1701, at least one application program may be run with a low-performance computing resource according to the minimum specification that can be executed for each application program (or to be run with low power consumption).

According to an embodiment, if the display 400 changes the operating state from the unfolding state 1701 to the folding state 1703, the electronic device 101 may change the second performance 1760 assigned to the first application program 1730 running in the first area 1710 to the first performance 1750, and may change the first performance 1750 assigned to the second application program 1740 running in the second area 1720 to the second performance 1760.

According to an embodiment, the electronic device 101 may configure different operating policies and accordingly run the first application program 1730 operating on the front surface and the second application program 1740 operating on the rear surface. For example, the electronic device 101 may increase the performance of the first application program 1730 operating on the front surface with a low performance (for example, second performance 1760) such that about 100% of the performance of the electronic device 101 is utilized, and may use the performance of the electronic device 101 partially limitedly, in the case of the second application program 1740 operating on the rear surface.

For example, referring to FIG. 17, in the unfolding state 1701, the first application program 1730 in the first area 1710 may operate with the second performance 1760 (for example, low-performance CPUs), the second application program 1740 in the second area 1720 may operate with the first performance 1750 (for example, high-performance CPUs); and if the unfolding state 1701 changes to the folding state 1703, the performance of the first application program 1730 in the first area 1710 operating as the front surface may change from the second performance 1760 to the first performance 1750, and the performance of the second application program 1740 in the second area 1720 operating as the rear surface may change from the first performance 1750 to the second performance 1760. For example, during folding of the display 400, the electronic device 101 may switch the low performance of an application program operating on the front surface to a high performance, and may switch the high performance of an application program which has been operating on the front surface, and which then switches to the rear surface and operates accordingly, to a low performance.

A method for operating an electronic device 101 according to various embodiments may include the operations of: displaying a first user interface related to a first application program on a first display surface (for example, first display surface 410 or 415 in FIG. 4 or FIG. 6); displaying a second user interface related to a second application program on a second display surface (for example, second display surface 420 or 425 in FIG. 4 or FIG. 6); receiving data from at least one sensor (for example, sensor module 176 in FIG. 1); and selecting one of a first mode or a second mode with regard to the first display surface 410 or 415 and one of a third mode or a fourth mode with regard to the second display surface 420 or 425, at least partially based on the data. The first display surface 410 or 415 may be capable of operating in a first mode in which first power is used and in a second mode in which second power is used, the second power being lower than the first power, and the second display surface 420 or 425 may be capable of operating in a third mode in which third power is used and in a fourth mode in which fourth power is used, the fourth power being lower than the third power.

According to various embodiments, in the selecting operation, the first mode and the fourth mode may be simultaneously selected, or the second mode and the third mode may be simultaneously selected, at least partially based on the data.

According to various embodiments, in the selecting operation, the first mode and the third mode may be simultaneously selected, and the third mode may be then changed to the fourth mode while maintaining the first mode, or the first mode may be changed to the second mode while maintaining the third mode, at least partially based on the data.

According to various embodiments, the first display surface 410 or 415 and the second display surface 420 or 425 may be configured to face away from each other in a folding state and to face in an identical direction in an unfolding state; and, in the selecting operation, the first mode and the third mode may be selected in the unfolding state, and the first mode and the fourth mode may be simultaneously selected, or the second mode and the third mode may be simultaneously selected, at least partially based on the data, in the folding state.

According to various embodiments, the method may include the operations of: sensing an operating state changing from an unfolding state to a folding state, based on at least one piece of data; distinguishing a front surface and a rear surface with regard to the first display surface 410 or 415 and the second display surface 420 or 425; executing an application program based on a first performance with regard to a display surface operating as the front surface; and executing an application program based on a second performance with regard to a display surface operating as the rear surface. The first mode and the third mode may include a mode in which the first application program and the second application program are run based on the first performance. The second mode and the fourth mode may include a mode in which the first application program and the second application program are run based on the second performance. The second performance may be inferior to the first performance.

According to various embodiments, in the operation of executing an application program based on a second performance, the display surface operating as the rear surface may be deactivated, and the application program operating on the corresponding display surface may be executed based on the second performance, or executed in the background so as to maintain the execution state of the application program.

According to various embodiments, the method may include the operations of: sensing an operating state in which the front surface and the rear surface switch, in the folding state, based on the at least one piece of data; distinguishing the front surface and the rear surface with regard to the first display surface 410 or 415 and the second display surface 420 or 425; running, based on the first performance, the application program operating based on the second performance, on the display surface switching to the front surface; and running, based on the second performance, the application program operating based on the first performance, on the display surface switching to the rear surface. According to an embodiment, if the front and rear surfaces of the display switch, the electronic device 101 may maintain the state of operation (or execution) of an application program, and may vary the performance mode for running the application program on the corresponding surface according to the state in which the display surface switches.

According to various embodiments, the method may include the operations of: displaying a switching object (for example, switching object 1250 in FIG. 12) in at least a partial area of the front surface in the folding state; acquiring a user input based on the switching object 1250; and displaying information regarding the application program on the rear surface, based on the user input, through the at least partial area of the front surface.

While the disclosure has been shown and described with reference to various embodiments thereof, it will be understood by those skilled in the art that various changes in form and details may be made therein without departing from the spirit and scope of the disclosure, as defined by the appended claims and their equivalents.

What is claimed is:
1. An electronic device comprising:
a housing comprising a first part and a second part;
a first display surface positioned on the first part and operable in a first mode in which first power is used and in a second mode in which second power is used, the second power being lower than the first power;
a second display surface positioned on the second part and operable in a third mode in which third power is used and in a fourth mode in which fourth power is used, the fourth power being lower than the third power;
at least one sensor positioned inside the housing and configured to sense a state in which a user moves or grips the electronic device;
at least one processor positioned inside the housing and operably connected to the at least one sensor; and
a memory positioned in the housing and operably connected to the at least one processor,
wherein the memory is configured to:
store a first application program comprising a first user interface, and a second application program comprising a second user interface, and
store instructions that, when executed, cause the at least one processor to:
display the first user interface on the first display surface;
display the second user interface on the second display surface;
receive data from the at least one sensor;
select one of the first mode or the second mode with regard to the first display surface and select one of the third mode or the fourth mode with regard to the second display surface, at least partially based on the data and a desired first and second application program performance;
sense an operating state changing from an unfolded state to a folded state, based on the data;

distinguish a front surface and a rear surface with regard to the first display surface and the second display surface;

execute an application program based on a first performance with regard to a display surface operating as the front surface; and execute an application program based on a second performance with regard to a display surface operating as the rear surface, wherein the first mode and the third mode comprise a mode in which the first application program and the second application program operate based on the first performance, wherein the second mode and the fourth mode comprise a mode in which the first application program and the second application program operate based on the second performance, and wherein the second performance is a performance of the electronic device more limited than the first performance.

2. The electronic device of claim 1, wherein the instructions are configured to, when executed, further cause the at least one processor to, at least partially based on the data:

simultaneously select the first mode and the fourth mode, or simultaneously select the second mode and the third mode.

3. The electronic device of claim 1, wherein the electronic device comprises at least one display driver integrated circuit (IC) (DDI) operably or electrically connected to the at least one processor, the first display surface, and the second display surface.

4. The electronic device of claim 1, wherein the instructions are configured to, when executed, further cause the at least one processor to:

simultaneously select the first mode and the third mode at least partially based on the data and then:

change the third mode to the fourth mode while maintaining the first mode; or change the first mode to the second mode while maintaining the third mode.

5. The electronic device of claim 1, wherein the housing further comprises a foldable structure, and wherein the first part and the second part are configured to:

face away from each other in a folded state of the foldable structure, and face in a same direction in an unfolded state of the foldable structure.

6. The electronic device of claim 5, wherein the first display surface and the second display surface are connected to each other and are formed by a flexible display.

7. The electronic device of claim 5, wherein the instructions are configured to, when executed, further cause the at least one processor to:

select the first mode and the third mode in the unfolded state and at least partially based on the data, in the folded state, simultaneously select the first mode and the fourth mode, or simultaneously select the second mode and the third mode.

8. The electronic device of claim 1, wherein the instructions are further configured to, when executed, further cause the at least one processor to:

deactivate the display surface operating as the rear surface; and execute, based on the second performance, the application program operating on the display surface, or execute the application program in a background to maintain an execution state of the application program.

9. The electronic device of claim 1, wherein the instructions are further configured to, when executed, further cause the at least one processor to:

sense an operating state in which the front surface and the rear surface switch, in the folded state, based on the data;

distinguish the front surface and the rear surface with regard to the first display surface and the second display surface;

run, based on the first performance, the application program operating based on the second performance, on the display surface switching to the front surface; and run, based on the second performance, the application program operating based on the first performance, on the display surface switching to the rear surface.

10. The electronic device of claim 1, wherein the instructions are further configured to, when executed, further cause the at least one processor to:

display a switching object in at least a partial area of the front surface in the folded state;

acquire a user input based on the switching object; and display information regarding the application program on the rear surface, based on the user input, through at least a partial area of the front surface.

11. A method for operating an electronic device, the method comprising:

displaying a first user interface related to a first application program on a first display surface;

displaying a second user interface related to a second application program on a second display surface;

receiving data from at least one sensor;

selecting one of a first mode or a second mode with regard to the first display surface, and one of a third mode or a fourth mode with regard to the second display surface, at least partially based on the data and a desired first and second application program performance;

sensing an operating state changing from an unfolded state to a folded state, based on the data;

distinguishing a front surface and a rear surface with regard to the first display surface and the second display surface;

executing an application program based on a first performance with regard to a display surface operating as the front surface; and executing an application program based on a second performance with regard to a display surface operating as the rear surface, wherein the first display surface is operable in the first mode in which first power is used, and in the second mode in which second power is used, the second power being lower than the first power, wherein the second display surface is operable in the third mode in which third power is used and in the fourth mode in which fourth power is used, the fourth power being lower than the third power, wherein the first mode and the third mode comprise a mode in which the first application program and the second application program are run based on the first performance, wherein the second mode and the fourth mode comprise a mode in which the first application program and the second application program are run based on the second performance, and wherein the second performance is a performance of the electronic device more limited than the first performance.

12. The method of claim 11, wherein the selecting comprises one of, at least partially based on the data:
the first mode and the fourth mode are simultaneously selected, or
the second mode and the third mode are simultaneously selected.

13. The method of claim 11, wherein the selecting comprises one of:
simultaneously selecting the first mode and the third mode at least partially based on the data and then:
changing the third mode to the fourth mode while maintaining the first mode, or
changing the first mode to the second mode while maintaining the third mode.

14. The method of claim 11,
wherein the first display surface and the second display surface are configured to face away from each other in a folded state and to face in a same direction in an unfolded state, and
wherein the selecting comprises one of:
selecting the first mode and the third mode in the unfolded state, and at least partially based on the data, in the folded state,
simultaneously selecting the first mode and the fourth mode, or
simultaneously selecting the second mode and the third mode.

15. The method of claim 11, wherein the executing of the application program based on the second performance comprises deactivating the display surface operating as the rear surface, and the application program operating on the corresponding display surface is:
executed based on the second performance, or
executed in a background to maintain an execution state of the application program.

16. The method of claim 11, further comprising:
sensing an operating state in which the front surface and the rear surface switch, in the folded state, based on the data;
distinguishing the front surface and the rear surface with regard to the first display surface and the second display surface;
running, based on the first performance, the application program operating based on the second performance, on the display surface switching to the front surface; and
running, based on the second performance, the application program operating based on the first performance, on the display surface switching to the rear surface.

17. The method of claim 11, further comprising:
displaying a switching object in at least a partial area of the front surface in the folded state;
acquiring a user input based on the switching object; and
displaying information regarding the application program on the rear surface, based on the user input, through at least a partial area of the front surface.

* * * * *